(12) United States Patent
DiSalvo, Jr. et al.

(10) Patent No.: US 7,455,927 B2
(45) Date of Patent: Nov. 25, 2008

(54) INTERMETALLIC COMPOUNDS FOR USE AS CATALYSTS AND CATALYTIC SYSTEMS

(75) Inventors: Francis J. DiSalvo, Jr., Ithaca, NY (US); Hector D. Abruna, Ithaca, NY (US)

(73) Assignee: Cornell Research Foundation, Inc., Ithaca, NY (US)

(*) Notice: Subject to any disclaimer, the term of this patent is extended or adjusted under 35 U.S.C. 154(b) by 163 days.

(21) Appl. No.: 10/630,237

(22) Filed: Jul. 29, 2003

(65) Prior Publication Data

US 2004/0126267 A1    Jul. 1, 2004

Related U.S. Application Data

(60) Provisional application No. 60/399,297, filed on Jul. 29, 2002.

(51) Int. Cl.
    *H01M 4/00* (2006.01)
(52) U.S. Cl. .................. 429/40; 502/325; 502/339; 502/349
(58) Field of Classification Search ............. 429/40, 429/225; 420/466; 502/325, 339, 349
See application file for complete search history.

(56) References Cited

U.S. PATENT DOCUMENTS

| | | | |
|---|---|---|---|
| 4,112,199 A | 9/1978 | Dunlop et al. | |
| 4,192,907 A | 3/1980 | Jalan et al. | |
| 4,221,719 A | 9/1980 | Fiege et al. | |
| 4,518,457 A | 5/1985 | Gray | |
| 4,522,894 A | 6/1985 | Hwang et al. | |
| 4,677,092 A | 6/1987 | Luczak et al. | |
| 4,933,026 A | 6/1990 | Rawlings et al. | |
| 5,006,308 A | 4/1991 | Liu et al. | |
| 5,096,866 A | 3/1992 | Itoh et al. | |
| 5,110,541 A | 5/1992 | Yamamasu et al. | |
| 5,238,755 A | 8/1993 | van Beijnen et al. | |
| 5,252,940 A | 10/1993 | Tanaka | |
| 5,489,563 A | 2/1996 | Brand et al. | |
| 5,496,655 A | 3/1996 | Lessing | |
| 5,620,651 A | 4/1997 | Sikka et al. | |
| 5,656,388 A | 8/1997 | Bugga et al. | |

(Continued)

FOREIGN PATENT DOCUMENTS

| | | |
|---|---|---|
| EP | 0 827 225 A | 3/1998 |
| GB | 1 106 708 A | 3/1968 |
| GB | 1 159 700 A | 1/1980 |
| JP | 62-269749 A | 11/1987 |

OTHER PUBLICATIONS

Invitation to Pay Additional Fees, with Results of Partial International Search in PCT/US03/23693, mailed Nov. 24, 2004.

(Continued)

*Primary Examiner*—Patrick Ryan
*Assistant Examiner*—Ben Lewis
(74) *Attorney, Agent, or Firm*—Wolf, Greenfield & Sacks, P.C.

(57) ABSTRACT

The invention is directed to intermetallic compounds for use as catalysts for chemical reactions and catalytic systems. The structure of ordered intermetallic compounds enables such compounds to function as highly efficient catalysts. The ordered intermetallic compounds may be used to catalyze reactions in fuel cells (e.g., hydrogen fuel cells), amongst numerous other applications.

9 Claims, 22 Drawing Sheets

U.S. PATENT DOCUMENTS

| | | | |
|---|---|---|---|
| 5,817,191 | A | 10/1998 | Emmerich et al. |
| 5,872,074 | A | 2/1999 | Schulz et al. |
| 5,888,665 | A | 3/1999 | Bugga et al. |
| 5,922,487 | A * | 7/1999 | Watanabe et al. ............. 429/44 |
| 6,232,264 | B1 * | 5/2001 | Lukehart et al. ............ 502/339 |
| 6,239,065 | B1 | 5/2001 | Schulz et al. |
| 6,746,508 | B1 | 6/2004 | Deevi et al. |
| 7,141,322 | B2 * | 11/2006 | Qi et al. ......................... 429/13 |
| 2002/0102451 | A1 * | 8/2002 | Acker et al. .................. 429/33 |

OTHER PUBLICATIONS

Massalski (Ed.), "Binary Alloy Phase Diagrams," American Society for Metals, XP002305217, pp. 528, 1901 (1986).

Norton Haner, A. et al., "Electrochemical Oxidation of Methanol on Tin-Modified Platinum Single-Crystal Surfaces," J. Phys. Chem. 95:3740 (1991).

DiSalvo, Francis J., Challenges and opportunities in solid-state chemistry, Pure Appl. Chem., vol. 72, No. 10, pp. 1799-1807, 2000.

Smith, Sean P.E., et al., Structural Effects on the Oxidation of HCOOH by Bismuth-Modified Pt(111) Electrodes with (100) Monatomic Steps, American Chemical Society, vol. 15, pp. 7325-7332, 1999.

Smith, Sean P.E. and Hector D. Abruna, Effects of the Electrolyte Identity and the Presence of Anions on the Redox Behavior of Irreversibly Adsorbed Bismuth on PT(111), J. Phys. Chem. vol. 102, pp. 3506-3511, 1998.

E. Casado-Rivera, Z. Gal, A.C.D. Angelo, C. Lind, F.J. DiSalvo, H.D. Abruna, Electrocatalytic Oxidation of Formic Acid at an Ordered Intermetallic PtBi Surface, Chemphyschem, vol. 4, pp. 193-199, 2003.

R.B. Van Dover, L.F. Schneemeyer & R.M. Fleming, Discovery of a useful thin-film dielectric using a composition spread approach, Nature, vol. 392, pp. 162-164, 1998.

Wang, K., On the Reaction Pathway for Methanol and Carbon Monoxide Electrooxidation On Pt-Sn Alloy Versus Pt-Ru Alloys Surfaces, Electrochimica Acta., vol. 41, No. 16, pp. 2587-2593, 1996.

Reddington, E., et al., Combinational Electrochemistry: A Highly Parallel, Optical Screening Method for Discovery of Better Electrocatalysts, Science, vol. 280, pp. 1735-1737, 1998.

Rabe, K.M., et al., Global multinary structural chemistry of stable quasicrystals, high-$T_c$ ferroelectrics, and high $T_c$ superconductors, Physical Review, vol. 45, No. 14, pp. 7650-7676, 1992.

Gurau, B., et al., Structural and Electrochemical Characterization of Binary, Ternary, and Quarternary Platinum Alloy Catalysts for Methanol Electro-oxidation, J. Phys. Chem., vol. 102, pp. 9997-10003, 1998.

Villars, P., A Three-Dimensional Structural Stability Diagram for 998 Binary AB Intermetallic Compounds, Journal of the Less-Common Metals, vol. 92, pp. 215-238, 1983.

Cnobloch, H., et al., "A 225 W ethylene glycol/air fuel cell battery", Progress in Batteries & Solar Cells (1982), 4 225-9.

Cnobloch, H., et al., "The conversion of ethylene glycol with air in alkaline fuel cells", Power Sources (1979), vol. Date 1978, 7 389-404.

Groeppel, D., et al., "Electrode for electrochemical oxidation of hydroxyl group-containing hydrocarbons", Ger. Offen. (1979), 13 pp.

Herrero, E., et al., "CO adsorption and oxidation on Pt(111) electrodes modified by irreversibly adsorbed bismuth in sulfuric acid medium", Journal of Catalysis (1995), 152(2), 264-74.

Kardigan, F., et al., "Electrocatalytic oxidation fo ethylene-glycol. Part II. Behavior of platinum0adatom electrodes in alkaline medium", Journal of Electroanalytical Chemistry and Interfacial Electrochemistry 1983), 143(1-2), 135-52.

Kokkinidis, G., et al., "Catalysis of ethylene glycol oxidation on a platinum electrode modified by foreign metal ad-atoms", Journal of Electroanalytical Chemistry and Interfacial Electrochemistry (1982), 133(2), 307-15.

Article from Journal of Kumming University of Science and Technology, vol. 27, No. 1, Feb. 2002, pp. 99-102.

Hamnett, A., et al., "Bimetallic Carbon Supported Anodes for the Direct Methanol-Air Fuel Cell", Electrochimca Acta. vol. 33, No. 11, pp. 1613-1618 (1988).

Watanabe, M., et al., "Preparation of Highly Dispersed Pt+Ru Alloy Clusters and the Activity for the Electrooxidation of Methoanol", J. Electroanal. Chem. 229 (1987) pp. 395-406.

Gasteiger, H., et al., "Temperature-Dependant Methanol Electro-Oxidation on Well-Characterized Pt-Ru Alloys", J. Electrochem. Soc., vol. 141, No. 7 (1994) pp. 1795-1803.

\* cited by examiner

Pt

INTERMETALLIC COMPOUNDS FOR USE AS CATALYSTS AND CATALYTIC SYSTEMS

CROSS-REFERENCE TO RELATED APPLICATION

This application claims priority to U.S. Provisional Patent Application Ser. No. 60/399,297, filed Jul. 29, 2002, the disclosure of which is incorporated herein by reference.

FEDERALLY SPONSORED RESEARCH

This invention was made with Government support from the National Science Foundation (NSF) under Grant Nos. 9805719, 9700859 & 0106279 and the Office of Naval Research (ONR) under Contract No. N00014-94-1010. The Government has certain rights in the invention.

FIELD OF INVENTION

The invention relates generally to intermetallic compounds for use as catalysts and catalytic systems, and, more particularly, to ordered intermetallic compounds used as electrocatalysts in fuel cell applications.

BACKGROUND OF INVENTION

A catalyst is a substance that increases the rate of a chemical reaction without, itself, being consumed in the reaction. Catalyzed reactions proceed through a mechanism that is not apparent in the stoichiometry of the reaction. For example, catalysts may be used in the rate-determining step of a reaction and later re-formed, so there is no net change in the concentration of the catalyst during the reaction. Specifically, catalysts lower the activation energy associated with the rate-determining step which accelerates the chemical reaction. Many types of materials may function as catalysts for different types of reactions.

Catalysts may be used in numerous applications. For example, a fuel cell is an electrochemical device that utilizes catalysts. Typically, a fuel cell includes an anode, a cathode, and a solid or liquid electrolyte therebetween. Fuel materials (e.g., hydrogen, fossil fuels, and small organic molecules) are brought in contact with the anode, and an oxidizing gas (e.g., oxygen and air) is brought in contact with the cathode. The fuel is oxidized in a chemical reaction which may be accelerated by the presence of a catalyst at the anode. The oxidizing gas is reduced in a chemical reaction which also may be accelerated by a catalyst at the cathode. The cell generates electricity when electrons generated in the fuel oxidation reaction at the anode flow through an external circuit to the cathode where the electrons are consumed in the reduction reaction.

A number of different materials have been investigated for use as catalysts in fuel cell electrodes (i.e., anodes and cathodes). In particular, anodes in cells that utilize small organic molecule fuels (e.g., methanol, formic acid, ethanol, and ethylene glycol, amongst others) must satisfy a number of property requirements. For example, in these fuel cells the anode must sufficiently catalyze the oxidation reaction, while minimizing the strong binding of CO, which is often produced in intermediate reactions, to the surface. This so-called "CO poisoning" can limit the catalytic activity of the anode over time which can severely impair cell maximum output power and efficiency.

Pure transition metals (e.g., Pt, Pd, Ni) have been used as electrocatalysts in small organic molecule fuel cells because of their high catalytic activity for these fuels. However, these metals, and particularly Pt, readily become poisoned with CO thus limiting cell performance over time. CO poisoning is particularly problematic at lower temperatures (e.g., less than 200 degrees C.).

Surface modified transition metal electrodes have also been investigated in small organic molecule fuel cells. Surface modification involves adsorbing monolayer amounts of metal adatoms (e.g., Bi) on the surface of the electrode. The metal adatoms may be selected from groups of metals that weakly bind oxygen, which is necessary for oxidation reactions, thus, enhancing the oxidation of CO to $CO_2$ and mitigating CO poisoning. However, the surface composition of surface modified electrodes may change over time as the metal adatoms react with impurities, desorb, or otherwise migrate from the electrode surface. Thus, CO poisoning can increase over time and may compromise cell performance.

Alloys of transition metals (e.g., Pt—Ru, Pt—Rh) have also been used as electrodes in small organic molecule fuel cells. However, while such alloys may perform better than Pt electrodes, they still may be susceptible to CO poisoning effects. Moreover, the composition of such alloys may change over time as species (e.g., Ru, Rh) migrate from the surface into the bulk to leave primarily the other alloy component (e.g., Pt) at the surface, which can be more susceptible to CO poisoning.

CO poisoning may also prevent hydrogen gas that includes relatively high levels of CO (e.g., greater than about 0.01 mole percent) from being used as a fuel in conventional hydrogen fuel cells that operate at relatively low temperatures (e.g., 80 degrees C. or less). The rapid adsorption of CO on electrode surfaces of these cells when oxidizing hydrogen gas, which includes high levels of CO, rapidly reduces the maximum output power and efficiency of such cells to unacceptable levels. Hydrogen gas that is produced by processing hydrocarbons (e.g., natural gas) in a reformer typically includes between about 3 and 10 mole percent CO. Therefore, such hydrogen gas must be further processed (e.g., using water gas shift reactors and/or preferential oxidizers) to reduce the CO concentration to acceptable levels (typically less than 0.001 mole percent) prior to using in conventional fuel cells at low temperatures.

SUMMARY OF INVENTION

The invention is directed to intermetallic compounds for use as catalysts for chemical reactions and catalytic systems.

In one set of embodiments, the invention provides a catalyst that comprises an ordered intermetallic compound and is designed for use in a catalytic system. In some embodiments, the catalyst may comprise an ordered platinum intermetallic compound, such as BiPt, $Bi_2Pt$, PtIn, PtPb, PtGe, $PtIn_2$, $PtIn_3$, $Pt_3In_7$, PtSn, $PtSn_2$, $Pt_3Sn$, $Pt_2Sn_3$, $PtSn_4$, PtSb, $PtSb_2$, PtGa, $PtCd_2$, and PtMn. In some embodiments, the catalyst may comprise an ordered palladium intermetallic compound. The catalyst, for example, can be designed for use in a fuel cell.

In another set of embodiments, the invention provides fuel cells that include a first electrode that comprises an ordered intermetallic compound and a second electrode. The fuel cell may include an electrode that comprises a platinum ordered intermetallic compound, such as BiPt, $Bi_2Pt$, PtIn, PtPb, PtGe, $PtIn_2$, $PtIn_3$, $Pt_3In_7$, PtSn, $PtSn_2$, $Pt_3Sn$, $Pt_2Sn_3$, $PtSn_4$, PtSb, $PtSb_2$, PtGa, $PtCd_2$, and PtMn. The fuel cell may include an electrode that comprises a palladium ordered intermetallic compound. The fuel cell may use hydrogen as a fuel. In other cases, the fuel cell may use, as fuel, small organic molecules such as formic acid, methanol, ethanol, ethylene glycol, 2 butyne 1,4diol, 2 butene 1,4diol, acetic acid, or oxalic acid. In some embodiments, the fuel cell includes an anode that comprises an ordered intermetallic compound, a cathode, and a proton exchange separator between the anode and the cathode.

In another set of embodiments, the invention provides methods of designing or producing a catalyst for a particular application. The methods may comprise selecting an ordered intermetallic compound as a catalyst for a particular fuel. The ordered intermetallic compound may be selected based on its electronic surface structure and/or its geometric surface structure. The geometric surface structure may have a desired interatomic distance (or range thereof). The interatomic distance between active sites (e.g., between Pt atoms) may be greater than a critical value, for example, to limit CO poisoning during operation.

In another set of embodiments, the invention provides a hydrogen fuel cell. The hydrogen fuel cell comprises a first electrode and a second electrode. The hydrogen fuel cell is capable of oxidizing hydrogen fuel comprising greater than about 0.01 mole percent carbon monoxide when operating for 30 minutes at conditions including a temperature of 80 degrees C. or less with a maximum output power of at least about 20% the maximum output power when oxidizing hydrogen fuel comprising less than about 0.0001 mole percent carbon monoxide for 30 minutes when operating at the conditions.

In another set of embodiments, the invention provides a hydrogen fuel cell. The hydrogen fuel cell comprises an anode and a cathode. The hydrogen fuel cell is capable of oxidizing hydrogen fuel comprising greater than about 0.01 mole percent carbon monoxide when operating for 30 minutes at conditions including a temperature of 80 degrees C. or less to produce a current density per unit surface area of the cathode of at least about 0.05 Amp/sq. cm.

In another set of embodiments, the invention provides a hydrogen fuel cell. The hydrogen fuel cell comprises a first electrode and a second electrode. The hydrogen fuel cell is capable of oxidizing hydrogen fuel comprising greater than about 0.01 mole percent carbon monoxide at conditions including a temperature of 80 degrees C. or less at a maximum output power after 30 minutes of operation of at least about 20% the maximum output power at the start of operation.

In another set of embodiments, the invention provides a method comprising oxidizing hydrogen fuel comprising greater than about 0.01 mole percent carbon monoxide for 30 minutes in a fuel cell at conditions including a temperature of 80 degrees C. or less with a maximum output power of at least 20% the maximum output power when oxidizing hydrogen fuel comprising less than about 0.0001 mole percent carbon monoxide in the fuel cell for 30 minutes at the conditions.

In another set of embodiments, the invention provides a method comprising oxidizing hydrogen fuel comprising greater than about 0.01 mole percent carbon monoxide for 30 minutes at conditions including a temperature of 80 degrees C. or less to produce a current density per unit surface area of the cathode of at least about 0.05 Amp/sq. cm.

In another set of embodiments, the invention provides a method comprising oxidizing hydrogen fuel comprising greater than about 0.01 mole percent carbon monoxide at conditions including a temperature of 80 degrees C., wherein the maximum output power after 30 minutes of operation is at least about 20% the maximum output power at the start of operation.

Other aspects, embodiments, and uses of the invention will become apparent from the following detailed description of non-limiting embodiments of the invention when considered in conjunction with the accompanying drawings, which are schematic and which are not intended to be drawn to scale. In the figures, each identical or nearly identical component that is illustrated in various figures typically is represented by a single numeral. For purposes of clarity, not every component is labeled in every figure, nor is every component of each embodiment of the invention shown where illustration is not necessary to allow those of ordinary skill in the art to understand the invention. In cases where the present specification and a document incorporated by reference include conflicting disclosure, the present specification shall control.

DETAILED DESCRIPTION OF INVENTION

Certain embodiments of the present invention involve the recognition that ordered intermetallic compounds may be used as high performing catalytic materials. The ordered intermetallic compounds may be used to catalyze reactions in fuel cells, amongst numerous other applications. As described further below, the unique structure of ordered intermetallic compounds enables such compounds to function as highly efficient catalysts. Ordered intermetallic compounds may be tailored to produce desired electronic and/or geometric effects that optimize catalytic behavior for specific reactions.

As used herein, the term "ordered intermetallic compound" refers to compounds that comprise more than one metal and have an ordered atomic structure. In an ordered intermetallic compound, substantially all unit cells include the same arrangement of metal atoms. Thus, a given atomic site in a unit cell is occupied by the same type of metal atom (e.g., Pt) in substantially all unit cells of an ordered intermetallic compound. Defects, which may be present in an ordered intermetallic compound, can cause a small number of unit cells in an ordered intermetallic compound to have a different arrangement of metal atoms than the majority of the unit cells. Defect types, for example, include vacancies, interstitials, atom substitutions and anti-site defects. In some cases, the defect concentration may be about 1 defect per 10 atoms, though, in many cases, the defect concentration is much lower (e.g., 1 defect per $10^5$ atoms or less).

In the present application, the term "ordered intermetallic compound" has the same meaning as the terms "intermetallic compound," "intermetallic," and "ordered intermetallic." All of these terms are used interchangeably throughout the application.

Ordered intermetallic compounds are to be distinguished from metal alloys and metal solid solutions. Alloys and solid solutions do not have an ordered atomic structure, as described above. Metal atoms are arranged randomly in unit cells of alloys and solid solutions. That is, a given atomic site may be occupied by different types of atoms in different unit cells of an alloy or solid solution. For example, in a 50:50:: Pt:Ru alloy ($Pt_{0.5}Ru_{0.5}$), the probability of an Ru atom occupying a specific site is 50% and the probability of a Pt atom occupying a specific site is 50%.

Ordered intermetallic compounds and their distinctions from alloys and solid solutions have been described in a number of references, for example, "Challenges and Opportunities in Solid-State Chemistry," DiSalvo, F. J., *Pure Appl. Chem.*, Vol. 72, No. 10, p. 1799-1807, 2000, which is incorporated herein by reference. However, it is also noted that other references have used the term "intermetallic compound" when referring to an "alloy" or "solid solution" as defined herein.

Figure 1:
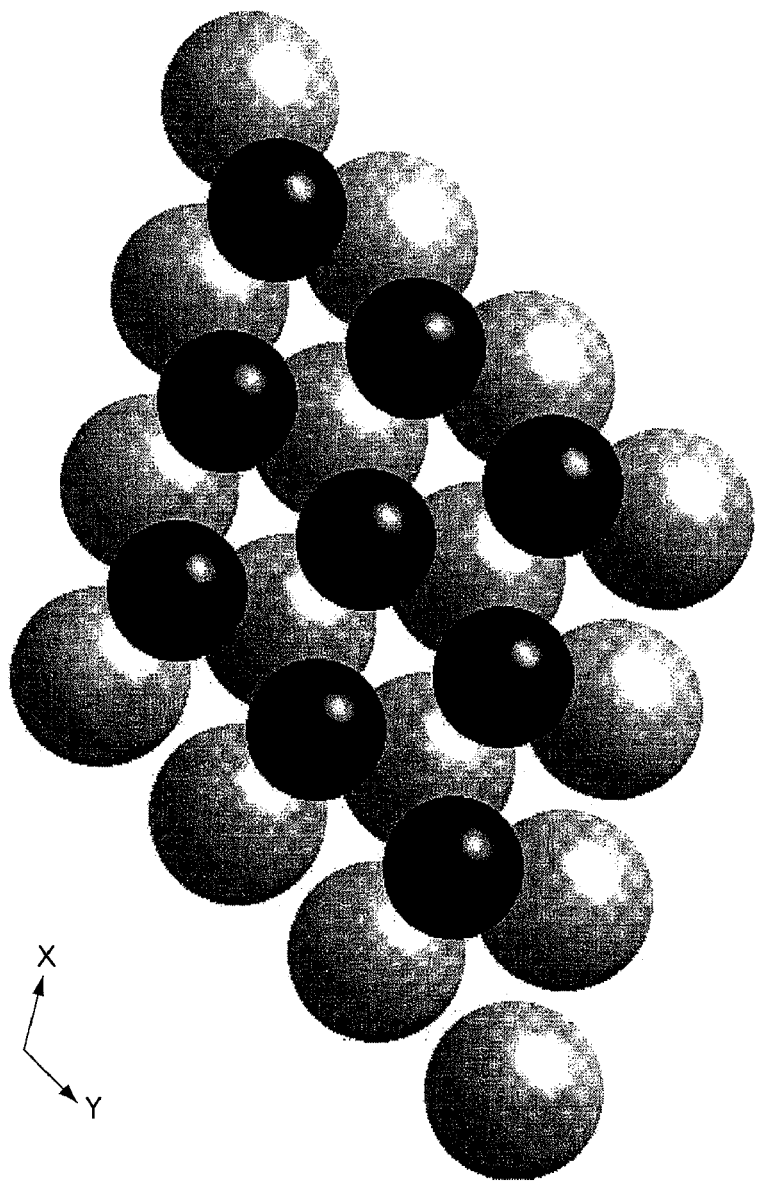
FIG. 1 schematically shows the atomic structure on the (001) plane of a PtBi ordered intermetallic compound according to one embodiment of the present invention.

As described above, ordered intermetallic compounds have the same arrangement of atoms throughout the crystal. Generally, the catalytic properties of a compound are influenced by the atomic arrangement of its constituent elements (e.g., the distance between and identity of nearest neighbor atoms). A given surface of an ordered intermetallic compound, defined by a set of three Miller indices, therefore, has a uniform catalytic behavior. If an intermetallic compound has a high catalytic activity for a particular reaction, then the entire surface of the intermetallic compound can provide that same high catalytic activity. In this way, ordered intermetallic compounds may be used to provide optimal catalytic performance. FIG. 1 schematically shows the atomic structure of the (001) plane of a PtBi ordered intermetallic compound.

Figure 2:
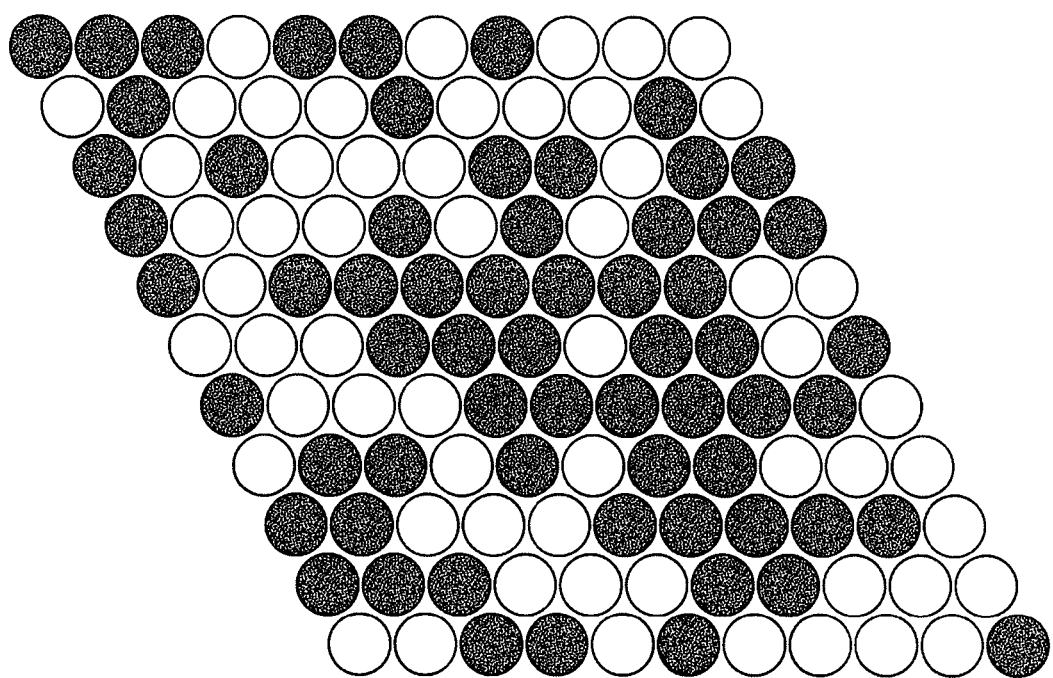
FIG. 2 schematically shows the atomic structure on the (111) plane of a $Pt_{0.5}Ru_{0.5}$ alloy.

In contrast, alloys and solid solutions have random arrangements of atoms. Thus, catalytic behavior varies across surfaces of alloys and solid solutions as the distance between and identity of nearest neighbor atoms varies. Therefore, even though alloys and solid solutions may have some highly catalytic regions, such compounds also have regions of lower catalytic activity. The regions of lower catalytic activity limit the overall ability of alloys and solid solutions to function as catalysts. For example, Pt alloys and solid solutions (e.g., Pt—Ru) may include regions where Pt atoms become randomly segregated. Because such segregates can behave like bulk Pt, these regions are highly susceptible to CO poisoning as described above. The CO poisoning in these regions, thus, can limit the overall catalytic performance of these alloys and solid solutions. Since ordered intermetallic Pt compounds (e.g., BiPt) do not have regions of Pt segregation, CO poisoning may be avoided across the entire surface. FIG. 2 schematically shows the atomic structure of the (111) plane of a $Pt_{0.5}Ru_{0.5}$ alloy.

Ordered intermetallic compounds also have a more stable atomic arrangement as compared to alloys and solid solutions. This stability results in consistent catalytic behavior that may be maintained over time. Some atoms in alloys and solid solutions are more prone to migrate to or from the surface into or out of the bulk over time, and thus, catalytic behavior may deteriorate.

The stability and ordered structure of intermetallic compounds also leads to less sample-to-sample variation in catalytic behavior than found in alloys and solid solutions, especially in small particles which may be preferred in some applications as described further below. For example, all catalytic surfaces of a specific orientation (e.g., (001) Pt plane in BiPt) of the same intermetallic compound have the same catalytic activity; while, all catalytic surfaces of a specific orientation of an alloy or solid solution need not have the same catalytic activity due to the random occupancy of surface sites.

A variety of ordered intermetallic compounds may be used as catalysts according to different embodiments of the present invention. As described further below, different intermetallic compounds may be more suited to catalyze certain reactions.

Typically, one (or more) metallic component(s) of the intermetallic compound has (have) a high catalytic activity for the reaction that the intermetallic compound is used to catalyze. A number of transition metals (e.g., platinum, palladium, nickel, cobalt, iron, manganese, ruthenium, rhodium, osmium, and iridium) are known to have relatively high catalytic activities for certain fuels and may be suitable as components in intermetallic compounds of the invention in embodiments that involve catalyzing such fuels. In particular, platinum is one of the most efficient catalytic materials for the oxidation of certain fuels such as small organic molecule fuels or hydrogen. Thus, in some embodiments of the invention, including embodiments that utilize small organic molecule fuels or hydrogen, platinum may be a preferred component of the intermetallic compound.

The second metallic component of the intermetallic compound is selected from the group of metals capable of forming an intermetallic compound with the first component. The ability of metals to form intermetallic compounds may readily be determined by one of ordinary skill in the art from published phase diagrams which indicate the presence of intermetallic phases.

The second metallic component may also be selected based on considerations the type of reaction to be catalyzed. For example, when catalyzing the oxidation of small organic molecule fuels, it may be desirable to select a metal as the second component that binds oxygen weakly enough so as to limit CO poisoning by promoting the final oxidation of CO to $CO_2$, which leaves the surface. Metals that weakly bind oxygen include heavier Group III-VI metals such as bismuth, lead, indium, germanium, lead, tin, gallium, cadmium, and antimony. In particular, lead, bismuth, gallium and indium may be effective in limiting CO poisoning, especially when combined with platinum, and are preferred in some embodiments of the invention.

Examples of suitable intermetallic compounds that may be used in accordance with the invention include, but are not limited to, BiPt, $Bi_2Pt$, PtIn, PtPb, PtGe, $PtIn_2$, $PtIn_3$, $Pt_3In_7$, PdGe, PdSb, IrBi, NiBi, PtSn, $PtSn_2$, $Pt_3Sn$, $Pt_2Sn_3$, $PtSn_4$, PtSb, $PtSb_2$, RhBi, PtGa, $PtCd_2$, PtMn, and BiPd. Other ordered intermetallic compounds also may be used in accordance with the invention including other intermetallic compounds that comprise the aforementioned elements at different stoichiometries.

It should be understood that intermetallic compounds of the invention may have a variety of stoichiometric ratios. For example, if a binary intermetallic compound is represented by the general formula $A_xB_y$, then x may equal 1, 2, 3 and the like; and y may equal 1, 2, 3, and the like. In some cases, intermetallic compounds having a 1:1 stoichiometric ratio (e.g., x=1 and y=1) may exhibit particularly high electrocatalytic activity. It should also be understood that the value of x or y may be slightly greater or slightly less than the whole numbers noted above, in part, due to the presence of defects (e.g., vacancies, interstitials, atom substitutions, anti-site defects) in the intermetallic compound atomic structure. For example, even though x or y may be represented in a formula as 1, the actual values of x or y may be between about 0.9 and 1.1 due to the presence of defects.

Suitable intermetallic compounds may be binary compounds (represented by the general formula $A_xB_y$). It should also be understood that higher order intermetallic compounds may also be used including ternary intermetallic compounds (represented by the general formula $A_xB_yC_z$), quarternary intermetallic compounds (represented by the general formula $A_xB_yC_zD_w$), and the like. Also, mixtures and alloys of binaries (e.g., $PtBi_{1-x}Pb_x$) are also suitable.

The ordered intermetallic compounds described herein may be used as catalysts in a variety of different reactions. In one set of preferred embodiments, the intermetallic compounds are used to catalyze oxidation reactions in fuel cell applications. Any suitable fuel used in fuel cells may be catalyzed using the ordered intermetallic compounds of the invention. Suitable fuels include small organic molecule fuels, hydrogen, and fossil fuels, amongst others.

The intermetallic compounds described herein may be particularly suitable for catalyzing the oxidation of small organic molecule fuels. Small organic molecule fuels are characterized by having one to four carbon atoms per molecule, such as formic acid, methanol, ethanol, ethylene glycol, 2 butyne 1,4diol, 2 butene 1,4 diol, acetic acid, and oxalic acid. It should be understood that molecules with a larger number of carbon atoms per molecule may also be used in some embodiments of the present invention.

The intermetallic compounds described herein also may be particularly suitable for catalyzing the oxidation of hydrogen. As described further below, intermetallic compounds of the invention may catalyze the oxidation of hydrogen even in the presence of relatively high concentrations of CO (e.g., greater than about 0.01 mole percent) because the structure of the intermetallic compounds can limit the binding of CO to surfaces of the compounds, thus, limiting CO poisoning. The ability to use hydrogen that includes relatively high concentrations of CO can lead to significant advantages because this may reduce, or eliminate, processing steps that are employed in order to lower the concentration of CO in hydrogen that is produced, for example, by steam reforming. In some cases, the intermetallic compounds may catalyze the reaction that converts CO to $CO_2$ at an electrode surface of the fuel cell. In addition to consuming CO, this reaction may advantageously increase the efficiency of the fuel cell. When used in hydrogen fuel cells, the intermetallic compound may also be used to catalyze fuel reformation.

It should be understood that the intermetallic compounds may also be used as highly efficient catalysts in a number of reactions including reactions that are not fuel cell-based. Other applications include, but are not limited to, water purification, toxic waste destruction, controlled explosive destruction and conversion of CO to $CO_2$ for pollution migration.

Though the intermetallic compounds listed herein may be suitable to catalyze a number of different reactions as a result of the above-described structural advantages of intermetallic compounds, certain intermetallics may be better suited to catalyze certain reactions. It has been found that BiPt, $BiPt_2$, PtPb and PtIn are particularly well suited for catalyzing the oxidation of formic acid. PtPb, PtSn and PtIn have been found to be particularly well suited for the oxidation of methanol, and PtPb, PtBi and PtIn have been shown to be particularly well suited for the partial oxidation of ethanol. The Examples below further illustrate the performance of specific intermetallic compounds with respect to certain fuels.

In some cases, it may be desired to catalyze the reaction at intermetallic compound surfaces having a specific orientation (e.g., (001)Pt plane in BiPt). Certain orientations may lead to increased catalytic activity for certain fuels.

It has been found that the surface electronic structure of an intermetallic compound is an important factor in determining its ability to optimally catalyze a particular reaction. For example, the electronic structure of a specific intermetallic compound may cause the intermetallic to have an increased affinity for a particular fuel which can enhance catalytic performance. The electronic structure of a specific intermetallic may also enable formation of reaction intermediates (e.g., surface oxides) at lower potentials during oxidation of a specific fuel which also increases catalytic activity. For example, the electronic structure of BiPt appears to result in an increased affinity for formic acid and the ability to enable formation of reaction intermediates during oxidation of formic acid, as illustrated further in the Examples below.

The atomic geometry of the surface of an intermetallic compound appears to be an important factor in determining its optimal ability to catalyze a particular reaction. In some cases, certain interatomic distances (or ranges thereof) may lead to improved adsorption for particular fuels and, thus, increased catalytic behavior. In other cases, certain interatomic distances (or ranges thereof) may limit binding of CO to surfaces and, thus, limit CO poisoning and enhance catalytic behavior. For example, the increase in interatomic nearest neighbor distance along one axis between Pt—Pt atoms in BiPt (4.3 Angstroms on the (001) plane) from the interatomic nearest neighbor distance between Pt—Pt atoms in Pt (2.77 Angstroms) has been shown to limit or eliminate CO poisoning. In some cases, it may be preferred for the intermetallic compounds to have interatomic nearest neighbor distances (e.g., between Pt—Pt atoms) of greater than at least 3.0 Angstroms along at least one axis; in some cases, greater than 3.2 Angstroms; in some cases, greater than 3.5 Angstroms; and, in some cases, greater than 4.0 Angstroms. In some of these cases, it may be preferred for the intermetallic compounds to have any of the above-noted interatomic nearest neighbor distances (e.g., greater than 3.0, 3.2, 3.5 or 4.0 Angstroms) along one axis and about 2.8 Angstroms along a second axis.

By controlling the electronic structures and geometric structure of an intermetallic compound through its composition, therefore, it is possible to optimize catalytic activity for certain fuels. That is, certain intermetallic compounds may be optimally matched with certain fuels using the methods of the present invention.

Screening techniques (See, e.g., van Dover, R. B.; Schneemeyer, L. F.; Fleming, R. M. *Nature* 1998, 392, 162) may be useful in rapidly determining which intermetallic compounds are particularly well-suited to catalyze certain types of reactions (e.g., fuel oxidation reactions). One screening technique is thermographic analysis. This technique involves forming an electrode by sputtering, or other methods, to produce a spread of compositions on a substrate which may include intermetallic compounds. This thermographic technique is well known to those of ordinary skill in the art. The electrode and a reference electrode may be submerged in an electrolyte containing a possible fuel. A thermographic map of the electrode surface is generated at several different, but uniform, potentials. The maps can then be examined by eye or image processing to determine the extent of electrocatalytic activity at different locations on the electrode surface which correspond to different compositions. The locations with the highest catalytic activity generally show the largest temperature changes. Such locations may be further analyzed to determine the composition (e.g., using XRF) and atomic structure (e.g., using XRD) of the material at that location. This information may be used to determine which intermetallic compounds may be particularly well-suited to catalyze the oxidation of certain fuels.

A second screening technique is scanning electrochemical microscopy (SECM). An electrode is produced by sputtering a spread of compositions on a substrate, as described above in connection with the thermographic technique. After submersing the substrate in a suitable electrolyte/fuel mixture, a small electrochemical probe is scanned across the electrode surface to measure current at different locations (with high spatial resolution) and probe potentials, thereby generating a map of the electrocatalytic activity on the surface. The map may be examined to determine the extent of electrocatalytic activity at different locations. Such locations may be further analyzed to determine the composition (e.g., using XRF) and atomic structure (e.g., using XRD) of the material at that location. This information may be used to determine which intermetallic compounds may be particularly well-suited to catalyze the oxidation of certain fuels.

The intermetallic compounds of the invention may be formed using known techniques. One suitable technique can involve forming a mixture that includes the desired stoichiometric ratios of the different metal components in solid form, (e.g., powder). The mixture may be thoroughly mixed and pressed to form a dense solid (e.g., a pellet) that is heated to a temperature above the melting point of the compound to produce a liquid. The temperature may be maintained above the melting point for an extended time period and, eventually, cooled to room temperature. If desired, to ensure production of a highly pure intermetallic compound the above process may be repeated. The resulting intermetallic compound may be characterized, for example, using x-ray diffraction techniques to determine the presence of the intermetallic phase.

When used as an electrode material for fuel cells, the intermetallic compound may be ground to form a high surface area powder. The powder may be embedded in the surface of an electrically conductive material, such as graphite, to form the electrode. Other conventional methods of producing powders (e.g., spray pyrolysis) and, particularly, powders having certain shapes may be employed. Certain shapes may be designed to expose surfaces having particular crystallographic orientations.

Figure 3:
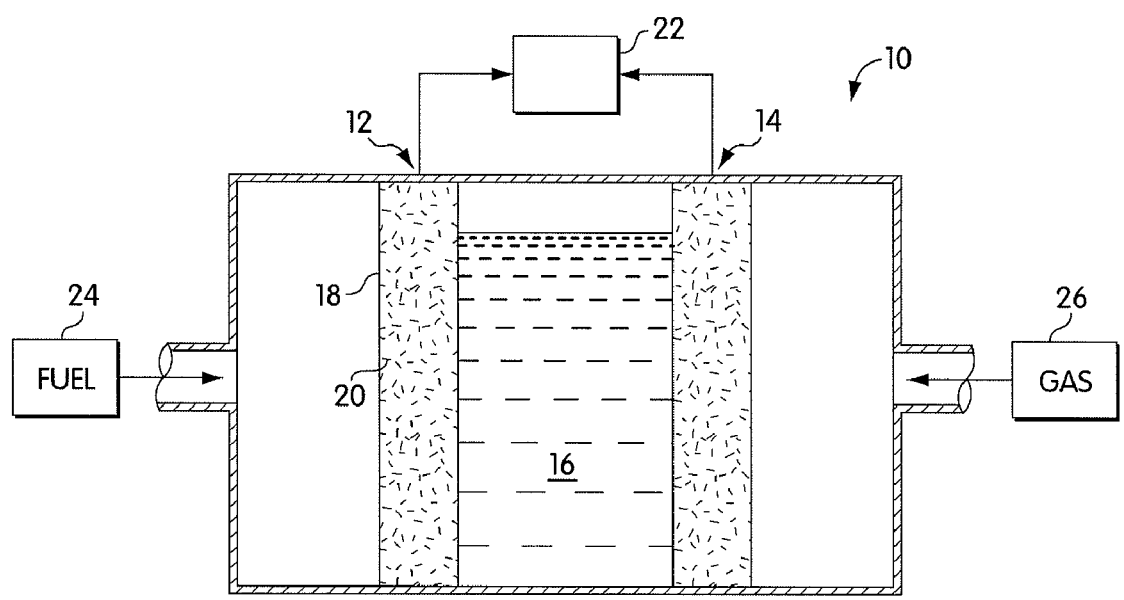
FIG. 3 schematically shows a fuel cell including an electrode comprising an ordered intermetallic compound according to one embodiment of the present invention.

As noted above, the ordered intermetallic compounds of the invention may be used as catalysts in a number of applications including fuel cells. FIG. 3 schematically shows a fuel cell 10 according to one embodiment of the present invention. Fuel cell 10 includes an anode 12 and a cathode 14 and an separator 16 therebetween. In the illustrative embodiment, the anode is formed of a conducting plate 18 that has a plurality of ordered intermetallic particles 20 embedded therein. Particles 20 may be formed of any of the intermetallic compounds described herein. An external circuit 22 may be electrically connected to the anode and cathode.

In some cases, separator 16 may be a proton exchange separator. The proton exchange separator may be any suitable type known in the art. In some cases, the proton exchange separator is a membrane. In some cases, the proton exchange separator may be a liquid (e.g., water). The proton exchange separator, for example, may be formed of a polymeric material or a salt. Proton exchange separators are particularly useful when a hydrocarbon fuel is being oxidized and/or the reaction is occurring at room temperature or relatively low temperatures. Such separators also serve to mitigate or completely block the flow of fuel to the cathode and to keep the fuel and oxidizer (typically oxygen from the air) separate. In some cases, fuel cell 10 may not include any type of separator, for example, in certain types of micro-fuel cells.

During use, fuel materials 24 are brought in contact with anode 12, and an oxidizing gas 26 is brought in contact with the cathode. The fuel is oxidized at the anode in a chemical reaction which is accelerated by the presence of the intermetallic compound which functions as a catalyst. The oxidizing gas is reduced at the cathode. The cell generates electricity when electrons generated in the oxidation reaction at the anode flow through the external circuit to the cathode where the electrons are consumed in the reduction reaction.

It should be understood that fuel cells of the invention may have any suitable construction and that the particular construction will depend upon the application. In some cases, the anode may be formed entirely of an intermetallic compound. In some cases, the cathode may comprise an intermetallic compound either in solid or particulate form. Depending on the application, the fuel cell may operate in a number of different temperature ranges. For example, the fuel cell may operate at relatively high temperatures (e.g., greater than 200° C.), at lower temperatures (e.g., less than 200° C., less than 80° C., etc.), or at about room temperature (about 20° C.).

In one set of embodiments, the fuel cells of the invention may use fuels having relatively high concentrations of CO because of the ability of electrodes of the invention to oxidize fuel, while limiting CO binding to their surfaces, thus preventing the CO poisoning that would be expected to occur in conventional fuel cells using such fuels. In some of these embodiments, the fuel cells are hydrogen fuel cells. This advantage of the present invention is particularly significant in fuel cells that operate at temperatures of 80 degrees C. or less. At these temperatures, CO, when present in hydrogen fuel in relatively high levels (e.g., greater than about 0.01 mole percent) rapidly adsorbs and sticks to electrode surfaces of conventional fuel cells. Thus, the maximum output power (and efficiency) of conventional fuel cells using such fuel rapidly drops to unacceptable levels (e.g., efficiency of less than 5%) soon after operation (e.g., after about 10 minutes or less) at these operating temperatures. Also, the maximum output power (and efficiency) of conventional fuel cells when oxidizing hydrogen that includes relatively high levels of CO (e.g., greater than about 0.01 mole percent) at these operating temperatures is significantly worse (e.g., less than about 5%) than the maximum output power (and efficiency) of the same conventional fuel cell operating at the same conditions when oxidizing hydrogen fuel including relatively low levels of CO (e.g., less than about 0.0001 mole percent).

As known in the art, the maximum fuel cell output power may be determined by generating a current-voltage curve for the fuel cell. The output power of a fuel cell, for a given current and voltage on the curve, may be obtained by multiplying the current and the voltage. The maximum output power is equal to the maximum value obtained when multiplying the respective fuel cell currents and voltages on the curve.

Fuel cells of the present invention are capable of oxidizing hydrogen fuel including relatively high levels of CO (e.g., greater than about 0.01 mole percent) with a maximum output power (and efficiency) that is comparable to when oxidizing hydrogen fuel including relatively low levels of CO (e.g., less than about 0.0001 mole percent) under the same conditions, even at low operating temperatures of 80 degrees C. or less. For example, the maximum power (and efficiency) of a fuel cell using hydrogen fuel including relatively high levels of CO may be at least 20% that when using hydrogen fuel including relatively low levels of CO when operating for at least 30 minutes (i.e., substantially steady-state condition) under the same conditions including a temperature of 80 degrees C. or less. In other cases, the maximum output power (and efficiency) when oxidizing relatively high levels of CO may be at least 50%, or even at least 90%, that when using hydrogen fuel including relatively low levels of CO relatively low levels of CO when operating for at least 30 minutes (i.e., substantially steady-state condition) under the same conditions including a temperature of 80 degrees C. or less.

The maximum output power (and efficiencies) described above are also achievable when the level of CO is significantly higher than 0.01 mole percent, such as greater than about 0.2 mole percent, greater than about 1.0 mole percent, greater than about 30 mole percent, or even higher. Therefore, fuel cells of the present invention may advantageously oxidize hydrogen fuel that has been produced in a reformer, which typically has CO levels of between about 3 and about 10 mole percent, without the need for further operating steps that reduce CO levels. The elimination of the processing steps that reduce CO concentration can lead to significant advantages because of the cost, time and complexity associated with such steps.

The fuel cells of the invention are also capable of oxidizing hydrogen fuel including relatively high levels of CO (e.g., greater than about 0.01 mole percent) at high current densities for an extended time period after the start of the oxidation step (e.g., at least about 30 minutes), even at low operating temperatures of 80 degrees C. or less. For example, hydrogen fuel cells of the invention may be capable of oxidizing hydrogen fuel including greater than about 0.01 mole percent carbon monoxide, when operating for at least 30 minutes at a temperature of 80 degrees C. or less, at a current density per unit surface area of the cathode of at least about 0.05 Amp/sq. cm. In some cases, significantly higher current densities per unit surface area of cathode are achievable under these conditions such as at least about 0.1 Amp/sq. cm and at least about 1.0 Amp/sq. cm.

Hydrogen fuel cells of the present invention may maintain their maximum output power (and efficiency) at relatively high levels over extended periods of time at low operating temperatures, even when relatively high levels of CO are present in the hydrogen fuel. For example, fuel cells may oxidize hydrogen fuel including greater than about 0.01 mole percent carbon monoxide at temperatures of 80 degrees C. or less such that the maximum output power (and efficiency) after 30 minutes of operation is at least about 20% the initial maximum output power (i.e., the maximum output power at the start of oxidation) (and efficiency). In some cases, the maximum output power (and efficiency) after 30 minutes of operation are significantly higher, such at least about 50% or at least about 90% the initial maximum output power (and efficiency).

It should be understood that fuel cells of the present invention may also oxidize hydrogen fuel including relatively high levels of CO at higher temperatures (e.g., greater than 80 degrees C.) with the above noted advantages. In general, oxidizing hydrogen fuel at higher temperatures reduces effects of CO poisoning in conventional fuel cells and fuel cells of the invention.

In some embodiments, the fuel cells of the invention may use fuels (e.g., hydrogen) having relatively high concentrations of sulfur because of the ability of electrodes of the invention to oxidize fuel, while limiting the binding of sulfur to their surfaces. For example, the fuel cells of the invention may use fuels having at least about 0.0001 mole percent sulfur. This prevention of sulfur poisoning, which generally occurs in conventional fuel cells when using fuels with high sulfur concentrations (e.g. greater than about 0.00001 mole percent), may allow processing steps that reduce sulfur concentration to be eliminated when producing fuel for use in fuel cells of the present invention. This can lead to significant cost and processing advantages.

Figure 11:
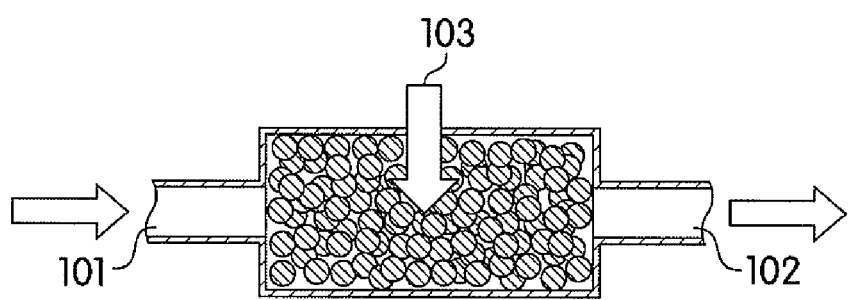
FIG. 11 schematically shows a fuel reformer with an ordered intermetallic catalyst bed.

Intermetallic compounds may also be used as catalysts in fuel reformers. Fuel reformers can be used to convert hydrocarbons and hydrocarbon-based compounds, and mixtures thereof, to lighter fuels such as methane or hydrogen. The reformed fuel, such as hydrogen, can then be fed to a fuel cell for oxidation and electricity production. Fuel reformers, such as the one illustrated schematically in FIG. 11 may include an inlet 101 for receiving a hydrocarbon base stock and an outlet 102 for dispensing a reformate, such as hydrogen. The hydrocarbon base stock may be mixed with air and/or steam, for examples, prior to entering the catalyst bed 103. The catalyst bed 103 is positioned so that the hydrocarbon base stock passes over the catalyst where it can be reformed to a lighter fuel such as hydrogen. The catalyst bed may be in any form known to those skilled in the art, such as, for examples, a granular powder, coated beads, or a coated ceramic monolith. A fuel reformer using a catalyst that includes one or more intermetallic compounds may be less susceptible to poisoning and may provide greater conversion efficiency of the fuel. A reformer catalyst including an ordered intermetallic compound, as disclosed herein, may be used with a feedstock mix of lower purity than other conventional catalysts.

The present invention will be further illustrated by the following examples, which are intended to be illustrative in nature and are not to be considered as limiting the scope of the invention.

EXAMPLE 1

This example illustrates the improved performance of an electrode formed from an ordered intermetallic compound (BiPt) according to one embodiment of the present invention and, in some cases, compares the performance to a conventional solid metal electrode.

Sample Preparation and Experimental System

A BiPt ordered intermetallic compound was prepared using the following procedure. Platinum powder (Johnson Matthey 99.999%) was mixed with bismuth powder from pellets (Alfa Aesar, 99.9999%) in a 1:1 molar ratio to obtain a 1.5 gram mixture. The mixture was thoroughly mixed using an agate mortar and pellets (6 mm O.D., 4 mm length) were pressed using a hydraulic press and a force of 3500 pounds. The pellets were sealed in evacuated fused silica tubes (10 mm I.D., 10 cm length) and placed upright in a box furnace. The tubes were heated at 800° C. for 24 hours and annealed at 650° C. for 48 hours. The pellets were ground to form a powder mixture which was mixed, pressed into pellets, and heated a second time following the same procedure described above.

The pellets were analyzed using powder X-ray diffraction (Scintag XDS2000 equipped with an energy sensitive detector, Cu K-alpha radiation) which indicated the presence of a single phase BiPt[32] (P63/mmc, a=4.315 Angstroms, c=5.490 Angstroms)

The resulting pellets were cut into cylinders (3 mm length) which were press-fitted into Teflon rods to form an electrode structure. Electrical contact was made through a graphite felt plug, which was, in turn, connected to a stainless steel holder. The plug could be connected to the rotating arbor of a Pine electrode rotator. Contact resistances between the stainless steel holder and the surface of the electrode were typically on the order of 3-4 ohms. Once mounted, the electrode surfaces were polished with 400 and 600 grid emery paper (Buehler) followed by a 1 micron diamond paste (Buehler) to a mirror finish.

Pure platinum electrodes were formed using the above-described platinum powder and following a similar procedure.

Prior to each experiment, electrodes were polished with the 1 micron diamond paste, rinsed with Millipore water (Millipore Milli-Q) and placed in an ultrasound bath for 10 minutes.

All the solutions used in the experiment were prepared with Millipore water. 0.1 M sulfuric acid (J. T. Baker-Ultrapure Reagent) solutions were used as supporting electrolyte. Formic acid (Fisher Chemical, 88% Certified ACS) was used. All solutions were deaerated with nitrogen for at least 15 minutes and measurements were conducted at room temperature. Carbon Monoxide (Matheson Air Products), CP Grade, was used.

An electrochemical setup similar to the one described in Smith, S. P. E.; Abruna, H. D. *Journal of physical Chemistry B*, 1998 102, 3506 was used. All potentials are referenced to a saturated Ag/AgCl electrode without regard for the liquid junction. Differential electrochemical mass spectroscopy (DEMS) was used to determine the production of CO and $CO_2$ from the oxidation of formic acid on the BiPt and bare Pt electrode surfaces. The ionization chamber used in the DEMS experiments was pumped by a Varian 250 l/s turbomolecular pump, which was backed by a Varian Triscroll dry pump in order to avoid contamination from oil vapors. Due to the high pressure in the ionization chamber during the electrochemical experiments, a Pfeiffer 65 l/s turbomolecular pump backed by a Pfeiffer dry diaphragm pump differentially pumped the mass spectrometer analysis chamber. The chamber was isolated from the ionization chamber through a pressure converter (Leybold Inficon IPC2A). The quadrupole mass spectrometer (Leybold Inficon Transpector H-100M) was connected to the analysis chamber and contained a Channeltron electron multiplier/faraday cup detector. The very short delay times allowed the measurement of the mass intensity of the products as a function of potential by slowly sweeping the potential (2 mV/sec).

Voltammetry in 0.1 M $H_2SO_4$

Figure 4:
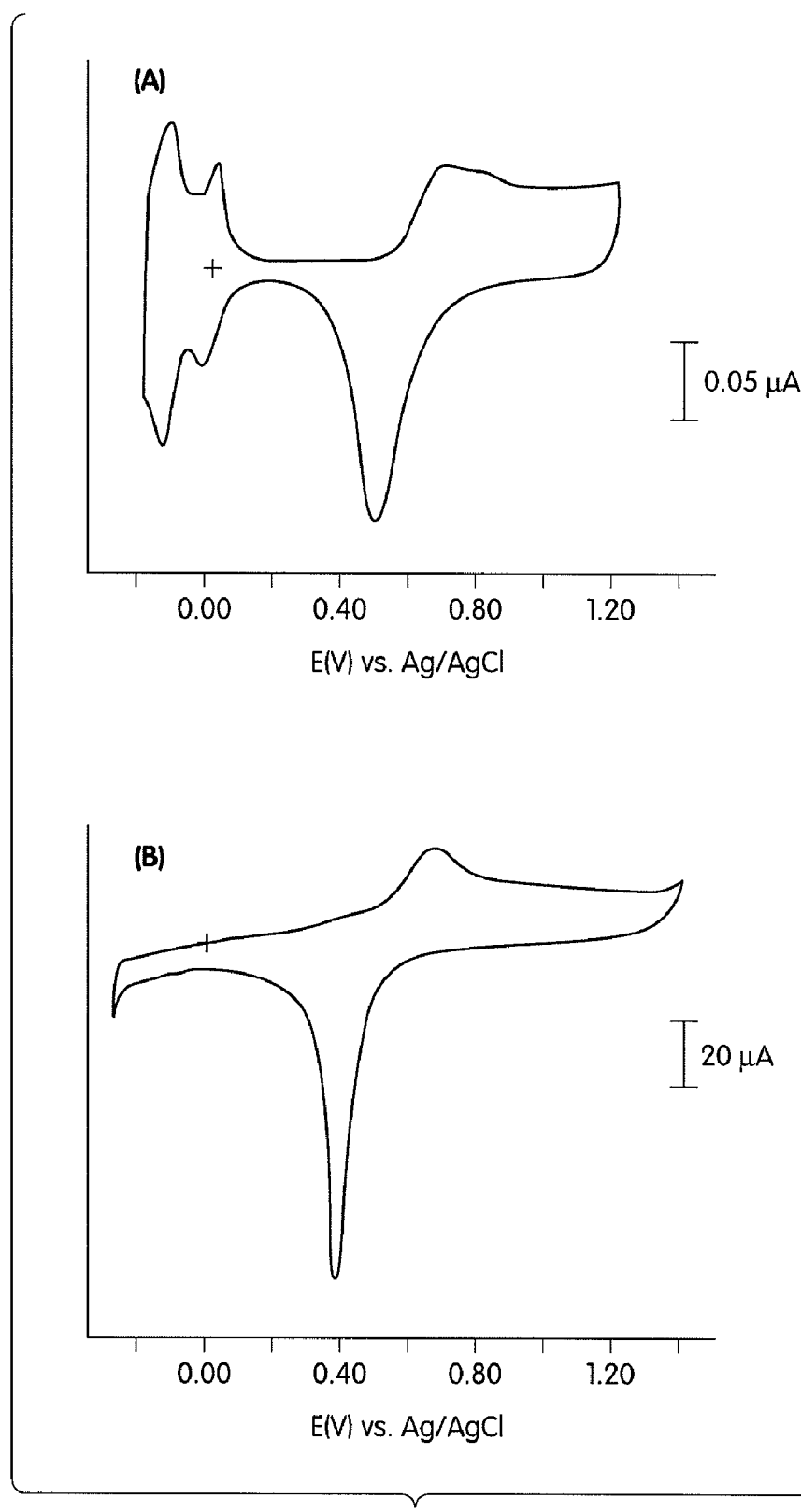
FIG. 4 shows voltammetric profiles in 0.1 M $H_2SO_4$ for a Pt electrode surface and an ordered intermetallic BiPt electrode surface, as described in Example 1.

Voltammetry measurements were obtained for the Pt electrode and the ordered intermetallic BiPt electrode in 0.1 M $H_2SO_4$. FIG. 4 shows the results for both samples. The Pt electrode shows its characteristic profile (A) including oxide formation and reduction peaks, as well as hydrogen adsorption waves. The BiPt intermetallic electrode profile (B) also shows oxide formation and reduction peaks, as well as a small wave at about −0.2 V which may suggest weak hydrogen adsorption.

The surface oxide formation and reduction peaks in BiPt profile are shifted negative as compared to Pt profile indicating the formation/reduction of surfaces oxides at lower potentials using BiPt electrodes. The BiPt electrode also had a significantly higher current density as compared to the Pt electrode.

Formic Acid Oxidation

Figure 5:
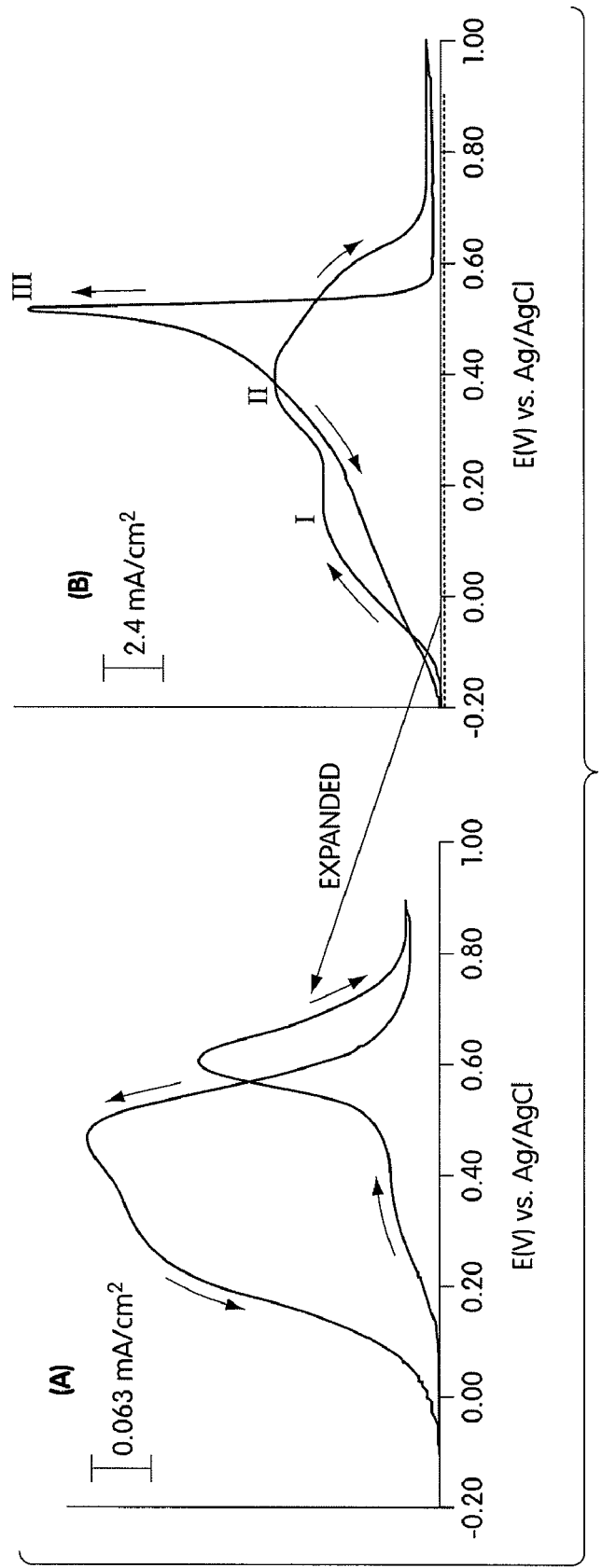
FIG. 5 shows voltammetric profiles for formic acid oxidation for a Pt electrode and an ordered intermetallic BiPt electrode, as described in Example 1.

FIG. 5 shows the voltammetric profile for formic acid oxidation on the Pt and BiPt electrode surfaces.

The Pt profile is consistent with known data and has an onset potential on the first anodic sweep of about +0.2 V. The current significantly increases in the cathodic sweep with a well defined hysteresis as a result of poisoning effects by CO and upon oxidation of the adsorbed CO.

The BiPt profile shows an onset potential of about −120 mV and reaches an apparent steady-state current (of ca. 5 mA/cm$^2$) at about +0.10 V. Scanning to more positive potentials results in an additional peak (peak II) followed by a decrease in current, presumably due to small CO poisoning effects. On the subsequent cathodic sweep there is a sharp peak (peak III) that decays as more negative potentials are reached. If the potential scan is limited to −0.20 V to +0.20 V the forward and reverse scan are virtually super-imposable. This suggests limited CO poisoning effects associated with the BiPt electrode.

A number of observations may be made from a comparison of the Pt profile and BiPt profile.

First, the current density at the BiPt electrode is dramatically higher than that for the Pt electrode. This is believed to be from a difference in activities between the two electrodes, but also may be due to difference in the microscopic electrode areas.

Figure 6:
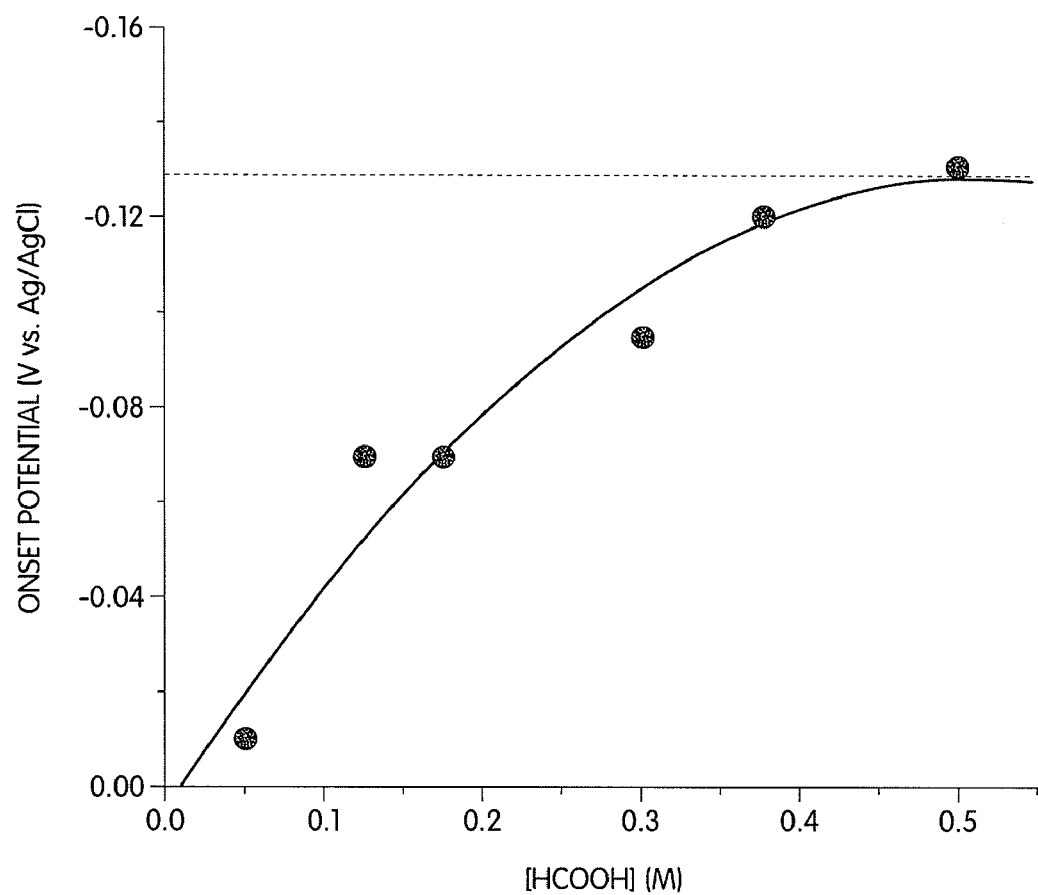
FIG. 6 shows a plot of the onset potential for formic acid oxidation on an ordered intermetallic BiPt electrode of the present invention as a function of formic acid concentration, as described in Example 1.

Second, the onset potential for formic acid oxidation is shifted negatively by over 300 mV for the BiPt electrode. In order to further study this dramatic advantage of the BiPt electrode, the onset potential for formic acid oxidation was measured as a function of its bulk concentration (FIG. 6). In these studies, the onset potential was taken as that at which the current reached 10 microAmps. Although the choice of the current magnitude was arbitrary, it does provide an estimate of the limiting value. In these studies the electrode was rotated at 3000 rpm in order to minimize the blockage of the electrode surface from gas (ostensibly $CO_2$ bubbles formed). In addition, the potential was swept slowly; typically at a rate of 10 mV/s.

As seen in FIG. 6, initially, the onset potential increases approximately linearly with formic acid concentration. At higher formic acid concentrations, there is less dependence. At the highest concentration examined, the onset potential for formic acid oxidation asymptotically reaches a value of ca. −0.13 V. As discussed above, this represents a dramatic improvement over the Pt electrode, with a difference of over 300 mV.

CO Poisoning

As discussed above, one disadvantage of using platinum as an electrocatalyst in fuel cell applications is its high propensity to poisoning by CO. In order to assess the susceptibility of BiPt to CO poisoning we carried out studies in sulfuric acid solution saturated with CO and compared the results to those on Pt.

Figure 7A:
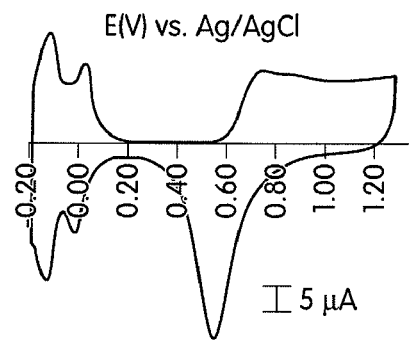
FIGS. 7A and 7B respectively show voltammetric profiles in 0.1 M $H_2SO_4$ for a Pt electrode surface before and after exposure to CO, as described in Example 1.
Figure 7B:
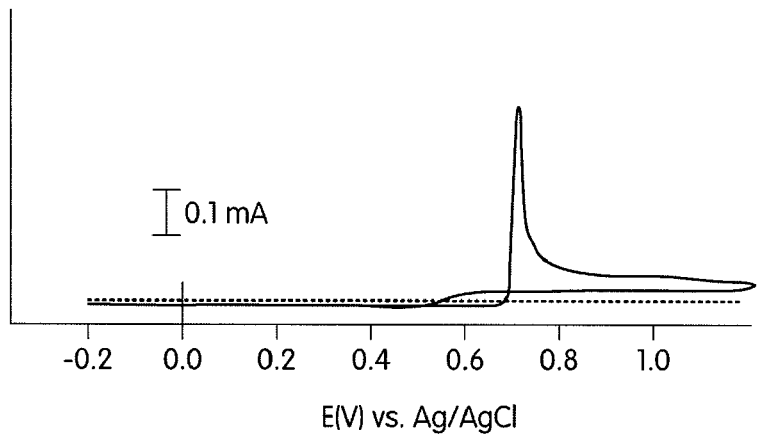

FIG. 7A shows the voltammetric profile for a Pt surface before exposure to CO and FIG. 7B shows the voltammetric profile for a Pt surface after exposure to CO. The results show that exposure to CO resulted in a rapid and irreversible adsorption by CO. As shown in FIG. 7A, the surface is strongly passivated to the point where there is essentially no current up to about +0.60V where there is a sharp peak ascribed to the oxidation of adsorbed CO to $CO_2$.

Figure 7C:
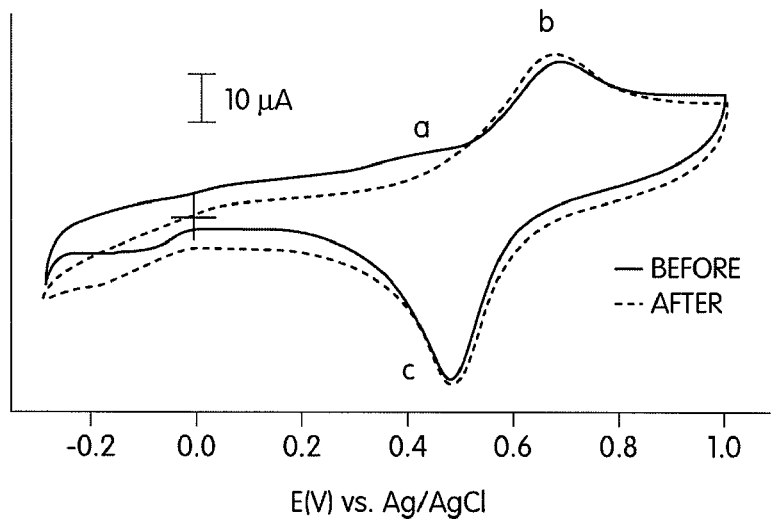
FIG. 7C shows voltammetric profiles in 0.1 M $H_2SO_4$ for an ordered intermetallic BiPt surface before and after exposure to CO, as described in Example 1.

FIG. 7C shows the voltammetric profile for a BiPt surface before and after exposure to CO. As shown in FIG. 7C, the voltammetric profiles are qualitatively very similar with a slight enhancement of peak b in the anodic sweep. It is believed that the slight enhancement may be due to both oxidation of CO to $CO_2$ as well as desorption of adsorbed CO. Peak C remained essentially unchanged. The results show that insignificant amounts, if any, of CO adsorbed to the BiPt surface.

These results indicate that CO has a much lower affinity towards the BiPt surface as compared to Pt. Thus, significantly less CO poisoning is found in BiPt electrodes. It is believed that the dramatic drop in the affinity of CO for BiPt is a direct consequence of its structure and, in particular, the difference in Pt—Pt interatomic distance in Pt versus the Pt—Pt distance in BiPt. In Pt, the Pt—Pt interatomic distance is 2.77 Angstroms; while in BiPt, the Pt—Pt interatomic distance is increased to 4.3 Angstroms (see FIGS. 8A and 8B). It is believed that the larger interatomic distances in BiPt make it very difficult for CO to bond to BiPt surfaces in a bridge site configuration, thus decreasing its bonding affinity.

Kinetic Studies

In order to examine the kinetics of formic acid oxidation at a BiPt electrode surface, rotated disk electrode experiments were carried out. In these studies the potential was swept (at 10 mV/sec) from −0.20 V to +0.25 V; the region that is of interest in certain fuel cell applications. It should also be mentioned that due to a significant gas evolution (ostensibly $CO_2$) the surface might be partially covered (especially at the slower rates of rotation).

Figure 9:
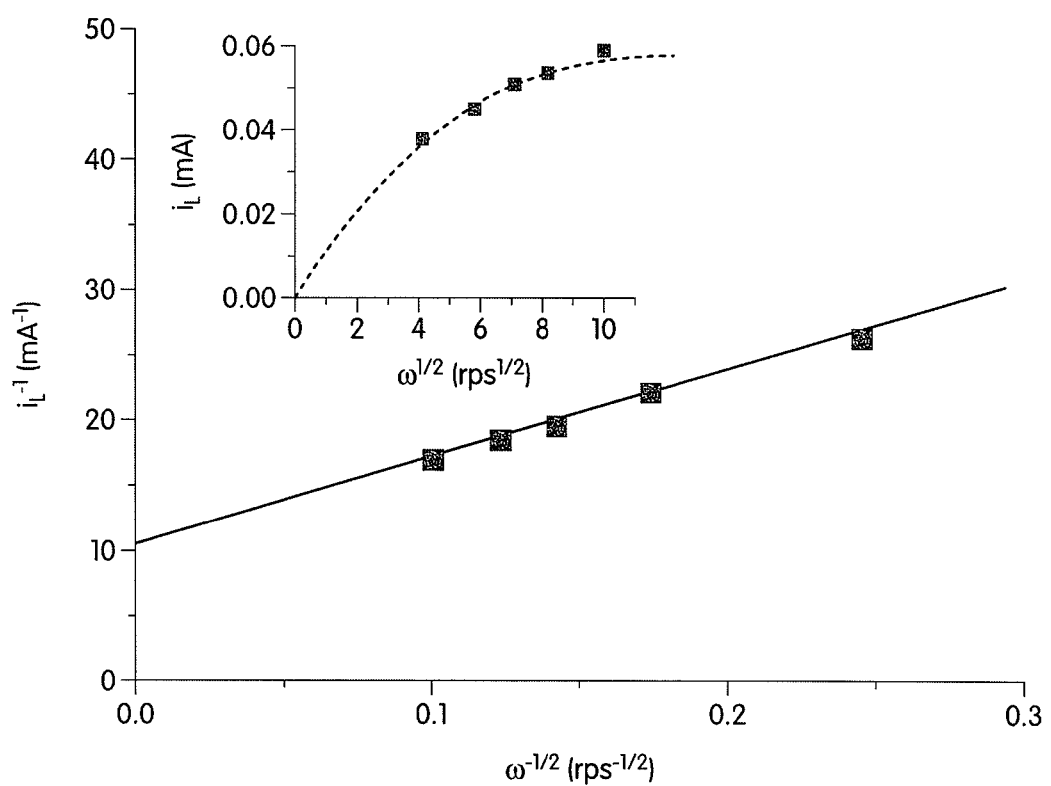
FIG. 9 shows a Levich plot (inset, $i_L$ vs. $(rps)^{1/2}$) and a Koutecky-Levich plot (main panel, $1/i_L$ vs. $1/(rps)^{1/2}$) for the oxidation of formic acid in 0.1 M $H_2SO_4$ for the BiPt electrode, as described in Example 1.

The inset to FIG. 9 shows a Levich plot ($i_L$ VS. $(rps)^{1/2}$) for the oxidation of formic acid at the BiPt electrode. In these experiments, the limiting current was measured at +0.20 V. As seen on the inset, the plot exhibits significant curvature, suggesting a reaction that is kinetically and not transport limited.

For a system that is kinetically controlled, theory predicts that a Koutecky-Levich plot ($1/i_L$ vs. $1/(rps)^{1/2}$) should be linear and from the intercept the value of the rate constant can be obtained. The main panel of FIG. 9 shows a linear Koutecky-Levich plot. From the intercept, a value of 1.4× $10^{-4}$ cm/s was obtained for the rate constant. This value is comparable to values obtained for various Pt surfaces under conditions that were intended to minimize poisoning by CO, as well as surface blocking from $CO_2$ evolution as described in Smith, S. P. E.; Ben-Dor, K. F.; Abruna, H. D. *Langmuir,* 1999, 15, 7325.

As discussed above, it is believed that the surface of the BiPt electrode is partially blocked by the evolution of $CO_2$. Thus, the value presented above likely represents a lower limit. In addition, the fact that it is comparable to platinum (even when the surface is partially blocked), attests to its electrocatalytic activity. Moreover, as discussed above, the onset potential is significantly shifted to less negative values and the surfaces appear to be relatively immune and/or tolerant to CO. All of these attributes clearly make BiPt a superior electrocatalyst for formic acid oxidation.

DEMS Studies

DEMS experiments were conducted to characterize the products from the electrocatalytic oxidation of formic acid using a BiPt electrode. DEMS allows for the detection of the (neutral) products of electrochemical reactions in real time. In these experiments, the potential applied to the BiPt electrode was varied at a slow scan rate (2 mV/sec), while the ion intensities at mass values of 28 and 44 corresponding to CO (as well as $N_2$) and $CO_2$, respectively, were monitored.

Figure 10A:
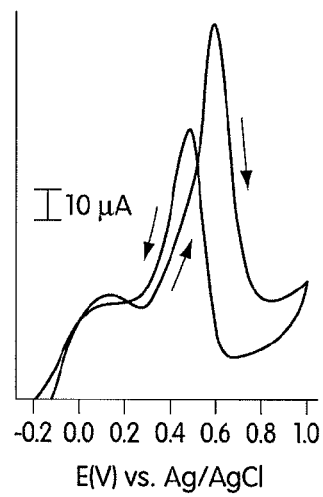
FIG. 10A shows the cyclic voltammetric profile for the oxidation of formic acid in 0.1 M $H_2SO_4$ for a BiPt electrode, as described in Example 1.
Figure 10B:
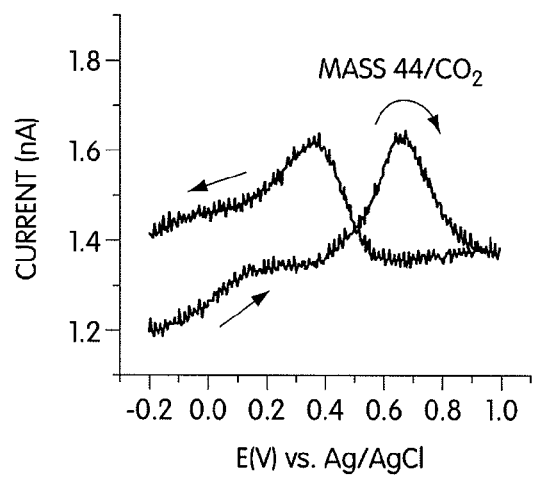
FIGS. 10B and 10C respectively show the ion current intensities from a differential electrochemical mass spectroscopy experiment for the oxidation of formic acid for a BiPt electrode corresponding to $CO_2$ and CO.
Figure 10C:
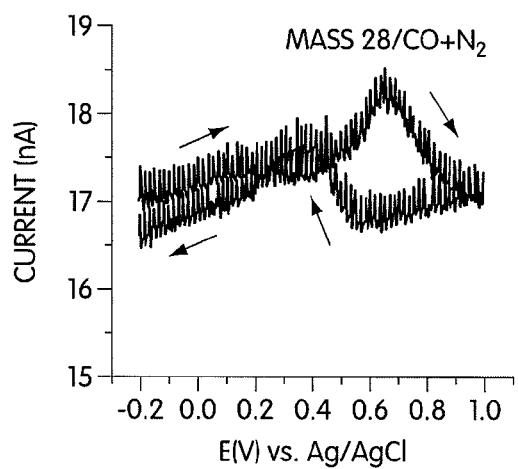

FIG. 10A shows the cyclic voltammetric profile (at 2 mV/sec) for the oxidation of formic acid at a BiPt electrode over the potential range of −0.2 to 1.0 V. FIGS. 10B and 10C show the ion current intensities corresponding to $CO_2$ and CO respectively. It is clear that the oxidation of formic acid gives rise to the generation of both $CO_2$ and CO and that there is a clear correspondence between the voltammetric profile in FIG. 10A and the profiles for the ion current intensities. The fact that both $CO_2$ and CO are generated would suggest that the dual path mechanism for formic acid oxidation is operating at the BiPt surface. In addition, the detection of CO also indicates that it is not strongly bound to the BiPt surface.

Discussion

The results obtained in these studies indicate that the BiPt ordered intermetallic phase has properties and reactivities that are dramatically different from those of bare platinum surfaces, with regards to formic acid oxidation. The onset potential for the electrocatalytic oxidation of formic acid on BiPt is significantly shifted (by over 300 mV) to more negative values as compared to Pt. The current density (at a given potential) is significantly increased for BiPt when compared to bare platinum. Finally, the BiPt surface appears to have a dramatically lower sensitivity to poisoning by CO.

The differences between Pt and BiPt are ascribed to both electronic and geometric effects. It is believed that the shift in onset potential and increase in current density are dominated by electronic effects. It is believed that formation of the BiPt ordered intermetallic results in a charge redistribution (as a first approximation arising from the work function differences), which enhances the affinity of BiPt towards formic acid, and further gives rise to the formation of surface oxides at lower potentials. These two effects combine to give rise to the enhanced performance observed. In addition, these effects are consistent with the generally accepted concept that, in these types of systems, the catalytic performance comes as the result of a combination of enhanced activation and the presence of surface oxides at low potentials.

Figure 8:
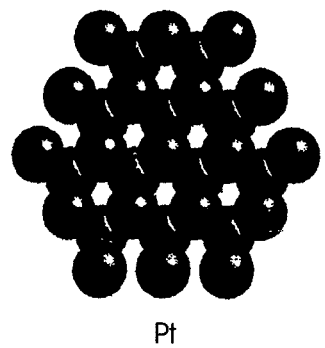
FIG. 8 shows the atomic structure of Pt.

In terms of geometric effects, it is believed that the greatly reduced propensity of BiPt towards poisoning by CO (relative to Pt) arises to a significant extent as a result of the increased Pt—Pt distance in BiPt (Pt—Pt=4.3 Å), (FIG. 1) in relation to Pt (2.77), (FIG. 8). However, it is also possible that electronic effects are involved.

Conclusions

The activity of the BiPt ordered intermetallic phase towards the electrocatalytic oxidation of formic acid has been investigated and the results compared to those on platinum. Relative to platinum, BiPt exhibits a greatly enhanced performance in terms of the current density and the onset potential. Moreover, BiPt was virtually immune to poisoning effects by CO. These factors suggest that BiPt is a superior material than Pt for electrocatalytic oxidation of formic acid.

It is believed that the enhanced performance of the ordered intermetallic phase is due to electronic and geometric factors. It is believed that the current enhancement and onset potential are most influenced by electronic effects, whereas the immunity to CO poisoning is largely controlled by the geometric/structural factors.

EXAMPLE 2

This example illustrates the improved performance of electrodes formed from a number of different ordered intermetallic compounds and, in some cases, compares the performance to a conventional solid metal electrode.

Sample Preparation and Experimental System $PtBi_2$, PtPb, PtIn, $PtIn_2$, $Pt_3In_7$, $PtSn_2$, $PtSn_4$, PtSb, PdBi, and PdSb intermetallic compounds were prepared using the following procedure. Stoichiometric amounts of platinum or palladium powder and powder of the appropriate second metal were sealed under vacuum in a silica tube. The samples were then heated (see Table 1 for temperatures) in a box furnace and held for from nine to twelve hours at that temperature before quenching to room temperature. Samples that exhibit peritectic decomposition typically needed to be annealed below the peritectic temperature for up to several days to achieve reasonable phase purity.

TABLE 1

| Intermetallic Phase | Temperature (° C.) |
|---|---|
| $PtBi_2$ | 735 |
| PtPb | 875 |
| PtIn | 1100 |
| $PtIn_2$ | 1100 |
| $Pt_3In_7$ | 1100 |
| $PtSn_2$ | 1100 |
| $PtSn_4$ | 850 |
| PtSb | 1150 |
| PdBi | 850 |
| PdSb | 850 |

The samples were then ground in an agate mortar and pestle, and XRD powder patterns were taken to confirm the composition and structure of the intermetallic phase. The procedure was repeated, without grinding, to cast the samples into suitable bulk electrodes. In order to eliminate porosity, the molten samples were periodically shaken to remove trapped gases.

PtMn, $Pt_3Sn$, $Pt_2Sn_3$, PtSn and $PtSb_2$ intermetallic compounds were prepared using the following procedure. Stoichiometric amounts of platinum powder and powder of the appropriate second metal were pressed into a pellet in a pellet press and subsequently arc-melted, forming a metallic button. Samples that exhibit peritectic decomposition typically needed to be annealed below the peritectic temperature for up to several days to achieve phase purity. These buttons were then cast into cylindrical slugs in graphite crucibles in an RF furnace. The samples were ground in an agate mortar and pestle, and XRD powder patterns were taken to confirm the composition of the intermetallic phase. The procedure was repeated, without grinding, to cast the sample into a suitable bulk electrode.

In most cases, the resulting pellets were cut into cylinders of ca. 3-5 mm in length and either 3 or 7 mm in diameter. The cylinders were press-fitted into Teflon rods to form an electrode structure. Electrical contact was made through a graphite felt plug which was, in turn, connected to a stainless steel holder. The plug could be connected to the rotating arbor of a Pine electrode rotator. Contact resistances between the stainless steel holder and the surface of the electrode were typically on the order of 3-4 ohms.

In cases where it was not possible to produce a cylindrical sample, the irregularly-shaped samples were polished (as described further below) and then connected to a platinum or silver wire with tin solder (this connection was subsequently covered with Teflon tape). For these electrodes, the contact resistance was less than 0.5 ohms and the electrochemical studies were performed using the hanging meniscus technique.

Prior to each experiment, electrodes were polished with diamond paste (METADI-Buehler, $\phi=1$ μm) and rinsed with Millipore water ($18 M\Omega cm^{-1}$, Millipore Milli-Q). In most cases after polishing with diamond paste, the electrodes were cycled in the supporting electrolyte over a potential range where there was no evidence of decomposition processes until a stable cyclic voltammogram was obtained (~10 min at 50 or 10 mV/s) prior to the oxidation of the fuel. All the solutions were prepared with Millipore water. Solutions of 0.1 M sulfuric acid (J. T. Baker-Ultrapure Reagent) were used as the supporting electrolyte in some cases. In other cases, perchloric acid (Aldrich Chemical Company Inc. —$HClO_4$ Redistilled 99.999% $HClO_4$ content 69.0-72.0%) was used as the supporting electrolyte instead of sulfuric acid. Formic acid (Fisher Chemical, 88% Certified ACS), methanol (Mallinckrodt Analytical Reagent, Anhydrous Meets ACS Specifications 99.9%), ethanol (Pharmaco Products Inc. 200 proof ACS/USP Grade), ethylene glycol (Mallinckrodt Analytical Reagent, Acidity 0.001%) and acetic acid (Alfa Aesar-Johnson Matthey, Glacial 99.9985%) were added (as received) to obtain fuel concentrations of 0.1 to 0.5 M. All solutions were deaerated with pre-purified nitrogen for at least 10 minutes and measurements were conducted at room temperature. All potentials are referenced to a saturated Ag/AgCl electrode without regard for the liquid junction.

Results: Oxidation of the Electrode Surface

Figure 12A:
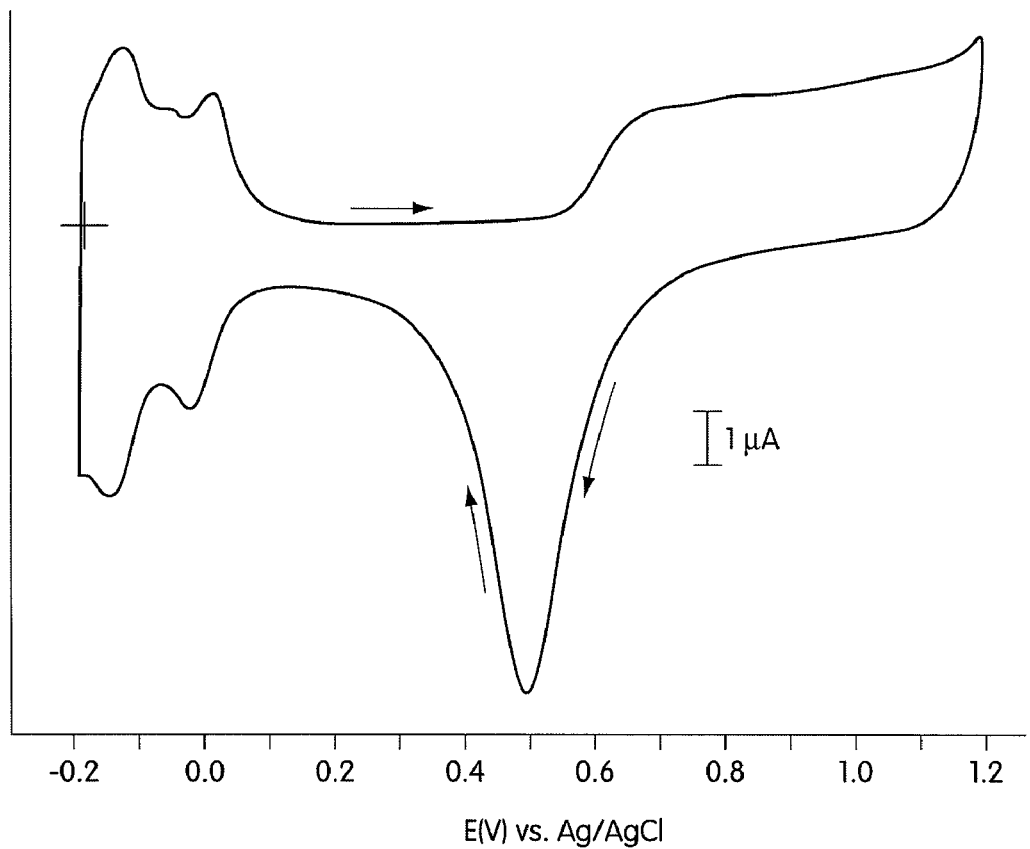
FIGS. 12A and 12B respectively show voltammetric profiles in 0.1 M $H_2SO_4$ for a Pt electrode surface and an ordered intermetallic PtPb electrode surface, as described in Example 2.
Figure 12B:
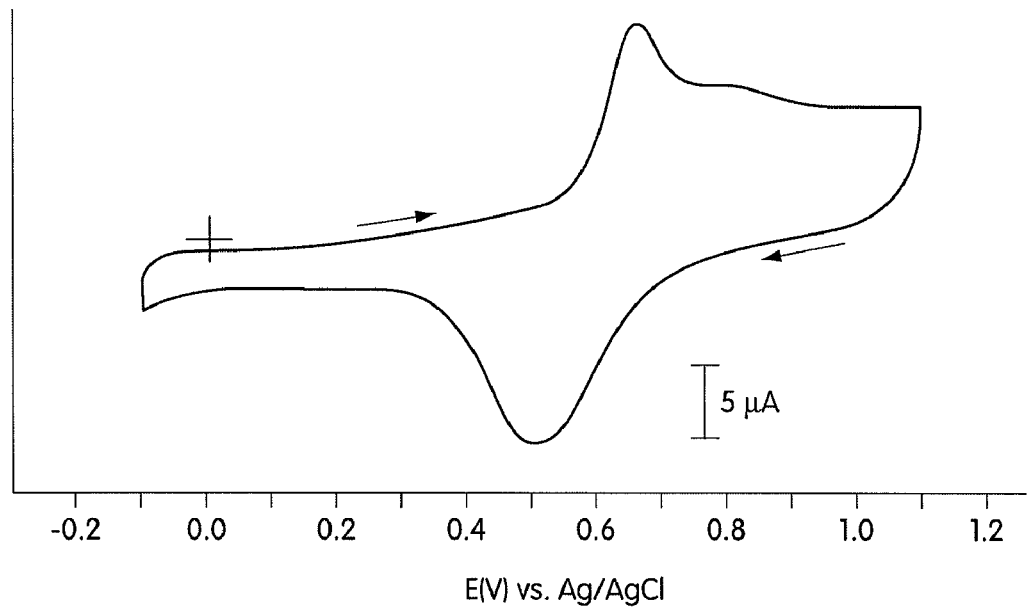

A number of electrodes were tested in sulfuric acid ($H_2SO_4$). FIGS. 12A and 12B respectively show the cyclic voltammograms obtained for a conventional pure Pt electrode and a PtPb electrode in a 0.1 M sulfuric acid solution. FIG. 12A shows the characteristic voltammetric profile for Pt with hydrogen adsorption/desorption peaks, as well as well-defined surface oxidation and reduction peaks (onset of oxidation at +0.56 V). In contrast, FIG. 12B shows very little, if any, evidence of hydrogen adsorption/desorption for the PtPb intermetallic compound.

Both profiles exhibited an oxidation wave in the potential range of +0.4 V to +0.6 V, which has been ascribed to surface oxide formation. The onset of surface oxidation tended to be shifted negative in the intermetallics compounds compared to that of pure Pt. Because it is widely believed that the presence of oxygenated species at the surface is critical to the oxidation of candidate fuels, these shifts are noteworthy and are summarized in Table 2.

| Electrode Material | Onset of Surface Oxidation in 0.1 M $H_2SO_4$ at a sweep rate of 10 mV/s |
| --- | --- |
| Pt | +0.56 V |
| PtBi | +0.50 V |
| PdBi | +0.63 V |
| PtPb | +0.50 V |
| PtSn | +0.40 V |
| $Pt_3Sn$ | +0.33 V |
| PtSb | +0.47 V |
| PtMn | +0.40 V |

A number of other electrode materials were tested in 0.1 M $HClO_4$. The choice of acid used as electrolyte was guided by the stability of the intermetallic in each acid. For instance, it was found that PtIn was unstable in $H_2SO_4$ at positive potentials and was thus studied in $HClO_4$. $Pt_3In_7$, $PtSn_2$ and $PtSn_4$ were determined to continuously corrode in both sulfuric acid and perchloric acid and were not studied further. Electrode stability appeared to be enhanced by high Pt content Pt, as particularly Pt-poor materials such as these readily dissolved at any potential. It is not known whether this effect was primarily driven by overall Pt content, or by dilated nearest neighbor Pt—Pt distances.

Figure 13A:
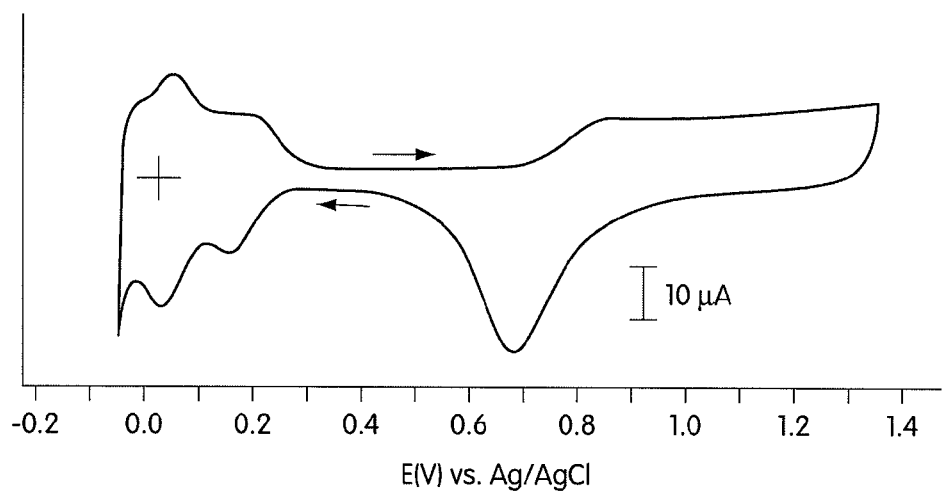
FIGS. 13A-13C respectively show voltammetric profiles in 0.1 M $HClO_4$ for a Pt electrode surface, an ordered intermetallic PtBi electrode surface, and an ordered intermetallic PtIn electrode surface, as described in Example 2.
Figure 13B:
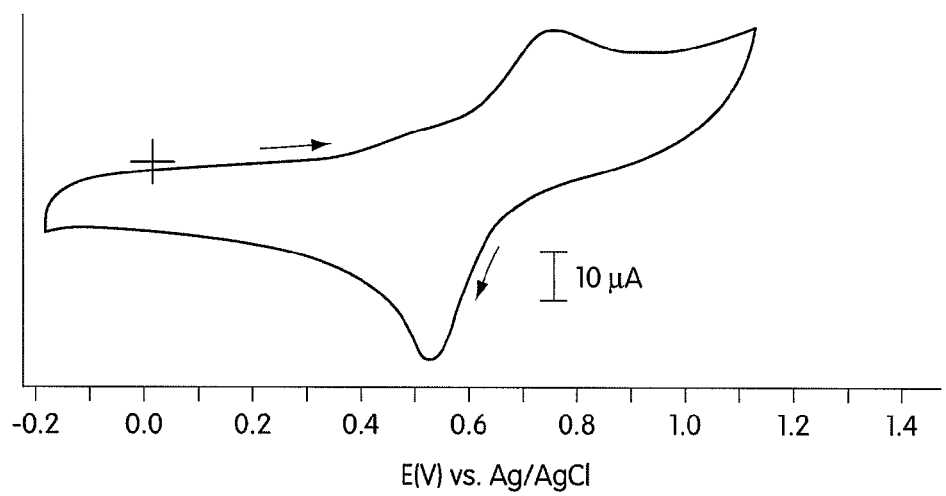
Figure 13C:
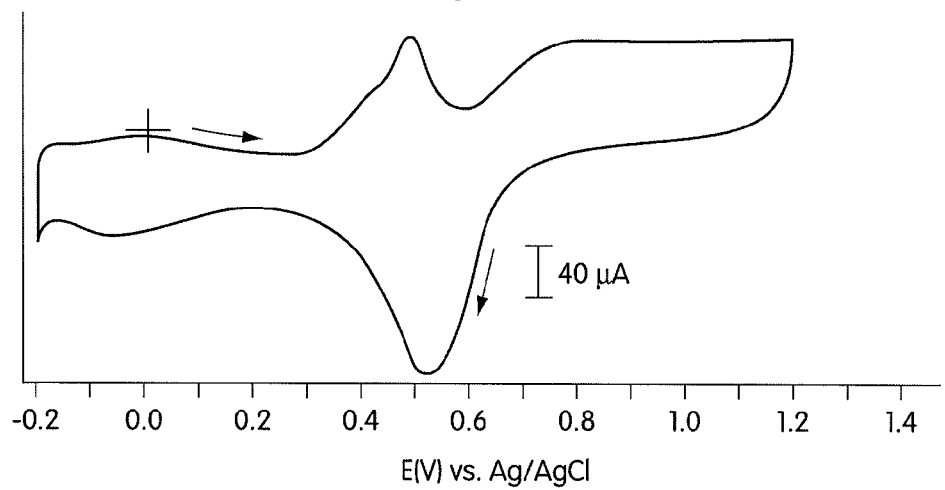

FIGS. 13A-13C respectively shows the cyclic voltammograms obtained for pure Pt electrode, PtBi electrode (prepared following the procedure in Example 1), and a PtIn electrode in a 0.1 M perchloric acid solution. The Pt electrode (FIG. 13A) showed the characteristic well-defined surface oxidation and hydrogen adsorption/desorption peaks. The profiles for the intermetallic compounds (PtBi, FIG. 2b; PtIn, FIG. 2c) had fewer features, lacking strong indication of hydrogen adsorption, and with far broader surface oxidation peaks. Data is summarized in Table 3.

TABLE 3

| Electrode Material | Onset of Surface Oxidation in 0.1 M $HClO_4$ at 10 mV/s |
| --- | --- |
| Pt | +0.56 V |
| PtBi | +0.56 V |
| PtIn | +0.35 V |
| $Pt_3Sn$ | +0.1 V |
| $Pt_2Sn_3$ | +0.3 V |
| PtSb | +0.25 V |
| PdSb | +0.56 V |

While the Sn-containing intermetallics displayed a dramatic negative shift in the onset of surface oxidation potential, these peaks were quite poorly defined, and partially obscured by a large ohmic current; thus the above values for these intermetallic compounds are presented with caution.

Formic Acid Oxidation

It is considered that formic acid may be used as an effective initial screen for candidate electrode materials. Mechanistically, formic acid can act as a model system for more complex oxidation pathways, such as those for ethanol and for methanol. For methanol, the catalyst must provide an additional oxygen atom to each fuel molecule, in addition to catalyzing dehydrogenation, to produce $CO_2$. For ethanol a catalyst must also break the C—C bond, to produce two $CO_2$ molecules from each ethanol molecule. Unlike those fuels, for formic acid oxidation, C—C bond cleavage is not necessary nor does additional oxygen need to be provided to generate $CO_2$. Thus, it is believed than any electrode that is active for either methanol or ethanol should show pronounced electrocatalytic activity for formic acid oxidation.

Figure 14A:
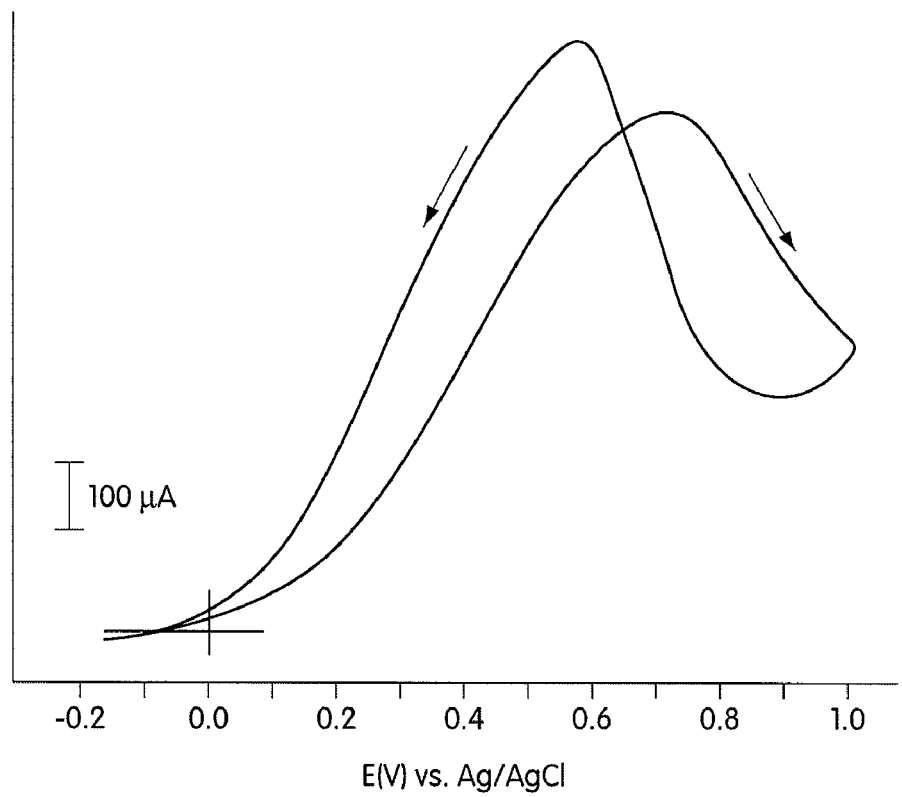
FIGS. 14A-14C respectively show voltammetric profiles in formic acid for an ordered intermetallic PtIn electrode surface, an ordered intermetallic PtPb electrode surface, and an ordered intermetallic PtSn electrode surface, as described in Example 2.
Figure 14B:
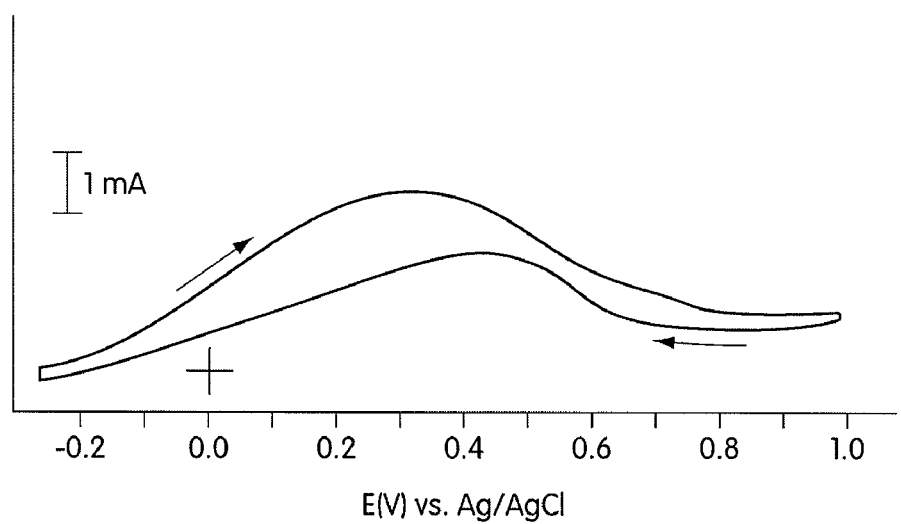
Figure 14C:
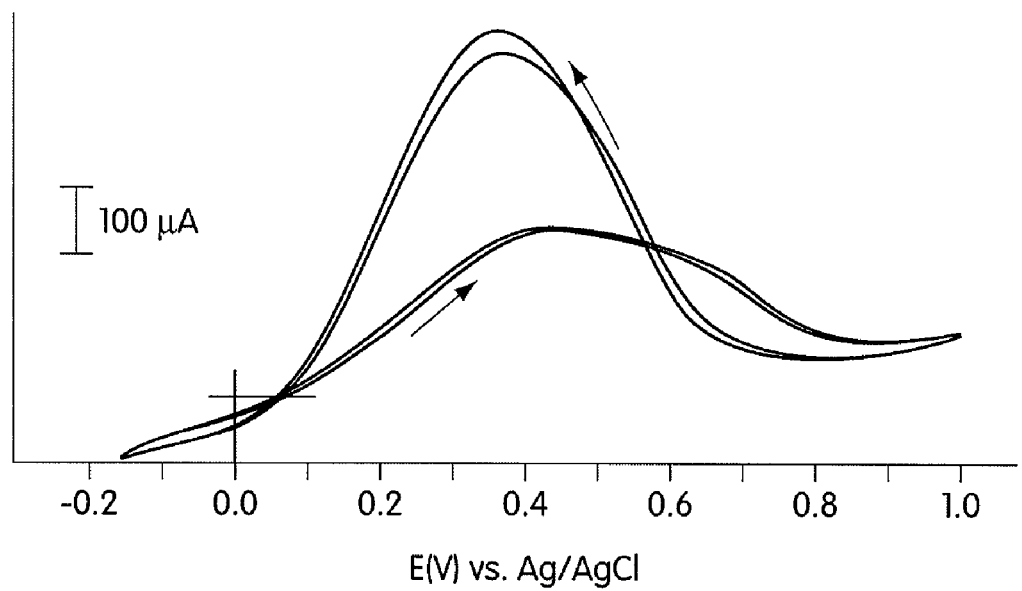

FIGS. 14A-14C depict representative cyclic voltammograms for PtIn (FIG. 14A), PtPb (FIG. 14B), and PtSn (FIG. 14C), all of which exhibited high electrocatalytic activity for the oxidation of formic acid. The $PtIn_2$, $PtSb_2$, PdBi and PdSb electrodes were also tested but were found to exhibit relatively low electrocatalytic activity toward formic acid oxidation, and thus are not shown. In fact, these materials were also found to be exhibit relatively low electrocatalytic activity toward other fuels tested (methanol, ethanol, ethylene glycol, and acetic acid), thus supporting the contention that formic acid can be a useful screen. $PtIn_2$ and $PtSb_2$ have nearest Pt—Pt distances of 4.501 Angstrom and 4.555 Angstrom, respectively, so these findings suggest Pt is necessary and having at least some Pt—Pt distances greater than 2.77 Angstrom (nearest neighbor distance between Pt—Pt atoms in Pt) may be advantageous for the materials to be active to fuel oxidation. Results for electrodes active toward formic acid oxidation are summarized in Table 4, noting that all values refer only to the anodic sweep of each CV.

TABLE 4

| Electrode | Electrolyte | Formic Acid Concentration | Onset of Oxidation Potential | Peak Current Potential | Peak Current Density |
| --- | --- | --- | --- | --- | --- |
| Pt | $H_2SO_4$ | 0.25 M | 150 mV | 680 mV | 220 $\mu A/cm^2$ |
| Pt | $HClO_4$ | 0.125 M | 120 mV | 650 mV | 500 $\mu A/cm^2$ |
| PtBi | $HClO_4$ | 0.125 M | 160 mV | 555 mV | 3.8 $mA/cm^2$ |
| PtBi* | $H_2SO_4$ | 0.125 M | −125 mV | 550 mV | 2.4 $mA/cm^2$ |
| $PtBi_2$** | $H_2SO_4$ | 0.5 M | 210 mV | 750 mV | 24 $mA/cm^2$ |
| PtPb | $H_2SO_4$ | 0.25 M | −150 mV | 260 mV | 8.2 $mA/cm^2$ |
| PtIn | $HClO_4$ | 0.125 M | 50 mV | 500 mV | 930 $\mu A/cm^2$ |
| PtMn | $H_2SO_4$ | 0.125 M | 100 mV | 400 mV | 40 $\mu A/cm^2$ |
| PtSn | $H_2SO_4$ | 0.5 M | 60 mV | 380 mV | 630 $\mu A/cm^2$ |
| $Pt_3Sn$ | $H_2SO_4$ | 0.25 M | 0 mV | 480 mV | 480 $\mu A/cm^2$ |
| $Pt_3Sn$ | $HClO_4$ | 0.25 M | 100 mV | 380 mV | 350 $\mu A/cm^2$ |
| $Pt_2Sn_3$ | $H_2SO_4$ | 0.5 M | −100 mV | 440 mV | 470 $\mu A/cm^2$ |
| $Pt_2Sn_3$ | $HClO_4$ | 0.125 M | *** | 430 mV | 20 $\mu A/cm^2$ |
| PtSb | $H_2SO_4$ | 0.5 M | −70 mV | 310 mV | 890 $\mu A/cm^2$ |
| PtSb | $HClO_4$ | 0.25 M | 0 mV | 260 mV | 100 $\mu A/cm^2$ |

*Summarized results from Example 1.
**Due to significant bubble formation, presumably $CO_2$, this electrode was rotated at 2000 rpm in an RDE configuration.
*** This value was unable to be determined.

Of the materials tested, PtBi, $PtBi_2$, PtPb, and PtIn showed the most promising results in formic acid. Upon cycling, each produced bubbles concomitant with the onset of anodic current, suggesting that formic acid was completely oxidized to $CO_2$. In fact, PtPb showed an onset of oxidation potential of approximately 300 mV less positive than pure Pt. While all current densities reported herein were calculated with respect to geometric surface area, and there was likely some degree of roughness associated with each electrode, all materials displayed a mirror finish upon polishing, which was still evident after cycling. Thus, it was highly unlikely that the enhanced current densities displayed by a number of the intermetallic electrodes (a factor of 40, in the case of PtPb) were primarily due to surface area discrepancies, but rather to significant increases in specific activity. In fact, the Pt electrode used for comparison was prepared and cleaned using the same procedure that was used for the intermetallic electrodes, and hence it likely had comparable surface roughness.

Methanol Oxidation

Figure 15A:
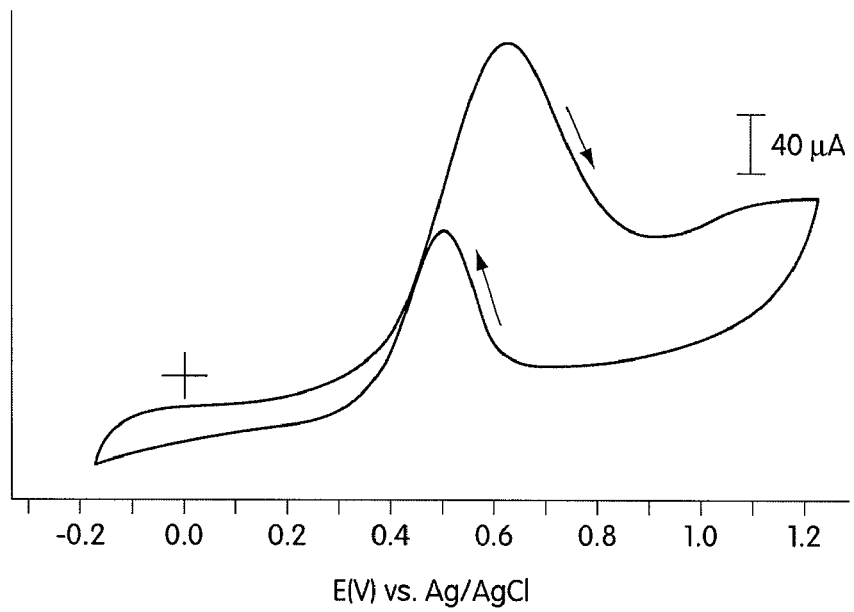
FIGS. 15A-15C respectively show voltammetric profiles in methanol for an ordered intermetallic PtIn electrode surface, an ordered intermetallic PtPb electrode surface, and an ordered intermetallic PtSn electrode surface, as described in Example 2.
Figure 15B:
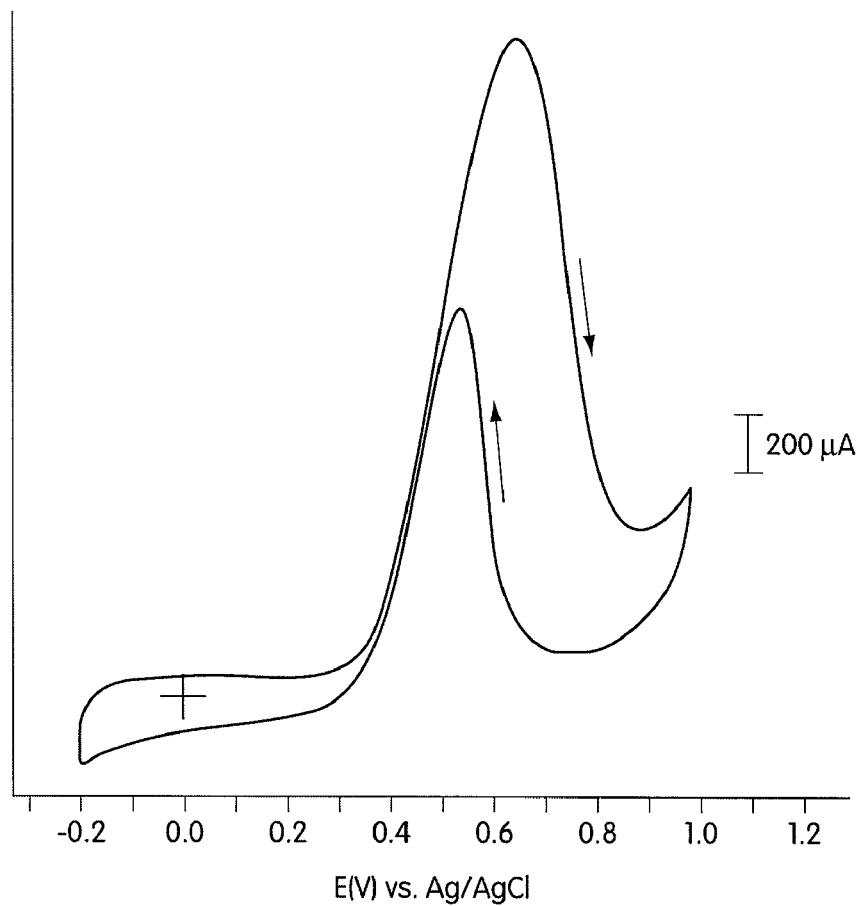
Figure 15C:
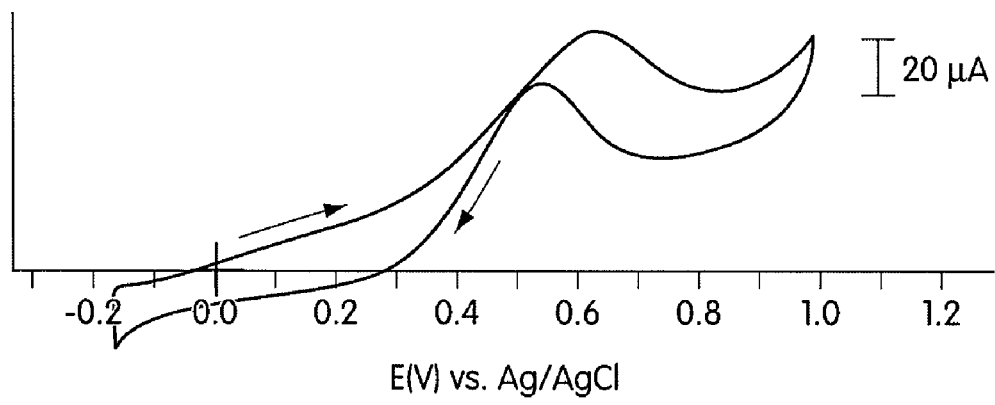

Each intermetallic compound was tested as an electrocatalyst for methanol oxidation. FIGS. 15A-15C presents the cyclic voltammograms of PtIn (FIG. 15A), PtPb (FIG. 15B), and PtSn (FIG. 15C), all of which were active towards the oxidation of methanol. The PtBi, PtBi$_2$, PtMn, Pt$_2$Sn$_3$, and Pt$_3$Sn ordered intermetallic phases, which all exhibited varying levels of activity toward formic acid oxidation, did not exhibit significant activity towards methanol to electro-oxidation. Results of the initial anodic sweeps for the materials studied in the activation of methanol are summarized in Table 5. Not surprisingly, all active electrodes showed a significant positive shift in onset of oxidation relative to that of formic acid, reflecting the expected difficulty in oxidizing methanol compared to formic acid. In this case, the catalyst must provide oxygen to the fuel to generate $CO_2$, in addition to dehydrogenating the fuel. However, a number of these intermetallic phases demonstrated enhanced activity when compared to pure Pt. For example, PtPb had an onset of oxidation potential 100 mV less positive than Pt. The PtIn and PtPb electrodes also displayed high current densities, similar to the values they displayed for formic acid oxidation. The current density of PtIn was approximately 3 times that of pure Pt, while PtPb had a current density more than 40 times as great as Pt.

TABLE 5

| Electrode | Electrolyte | Methanol Concentration | Onset of Oxidation Potential | Peak Current Potential | Peak Current Density |
|---|---|---|---|---|---|
| Pt | $H_2SO_4$ | 0.25 M | 390 mV | 640 mV | 210 µA/cm$^2$ |
| Pt | $HClO_4$ | 0.25 M | 370 mV | 570 mV | 400 µA/cm$^2$ |
| PtPb | $H_2SO_4$ | 0.2 M | 290 mV | 630 mV | 8.0 mA/cm$^2$ |
| PtIn | $HClO_4$ | 0.125 M | 330 mV | 610 mV | 1.1 mA·cm$^2$ |
| PtSn | $H_2SO_4$ | 0.5 M | 300 mV | 600 mV | 110 µA/cm$^2$ |
| PtSb | $H_2SO_4$ | 0.25 M | 430 mV | 620 mV | 40 µA/cm$^2$ |

Ethanol and Acetic Acid Oxidation

Each intermetallic compound was tested as an electrocatalyst for ethanol oxidation. The PtBi$_2$, Pt$_2$Sn$_3$, and Pt$_3$Sn intermetallic phases were found to exhibit non-significant activity towards ethanol oxidation. However, both PtBi and PtMn, which exhibited non-significant activity towards methanol oxidation, exhibited significant ability to oxidize ethanol.

Figure 16A:
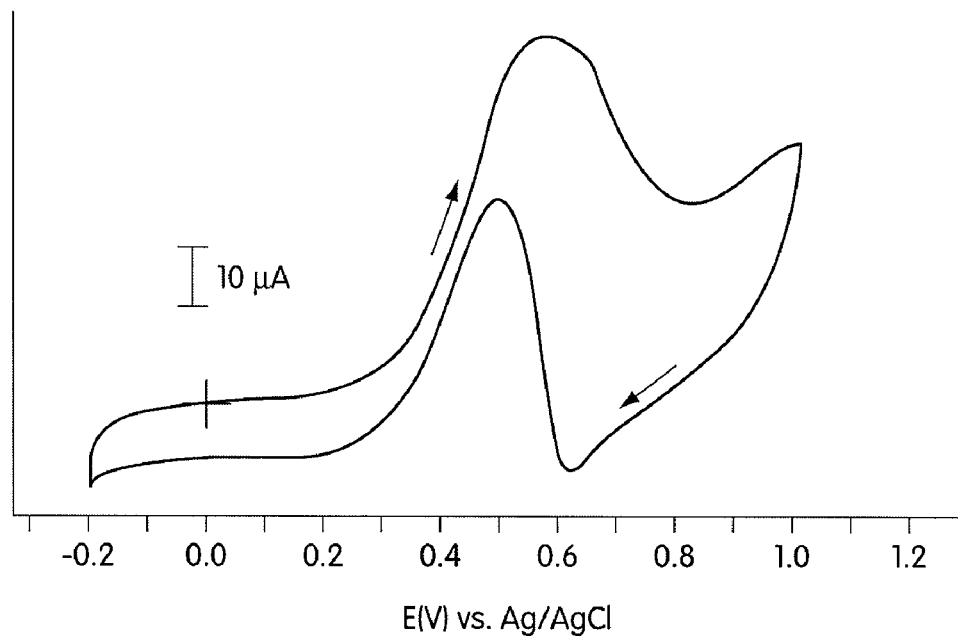
FIGS. 16A-16C respectively show voltammetric profiles in ethanol for an ordered intermetallic PtBi electrode surface, an ordered intermetallic PtIn electrode surface, and an ordered intermetallic PtPb electrode surface, as described in Example 2.
Figure 16B:
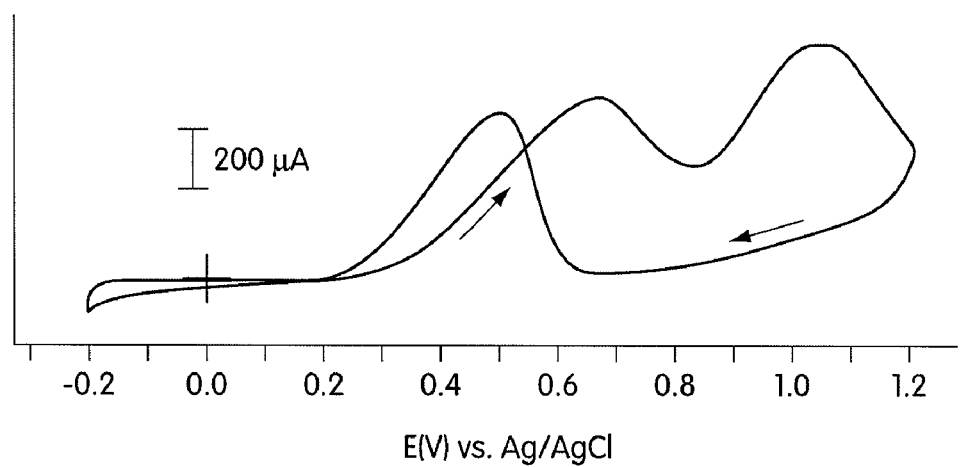
Figure 16C:
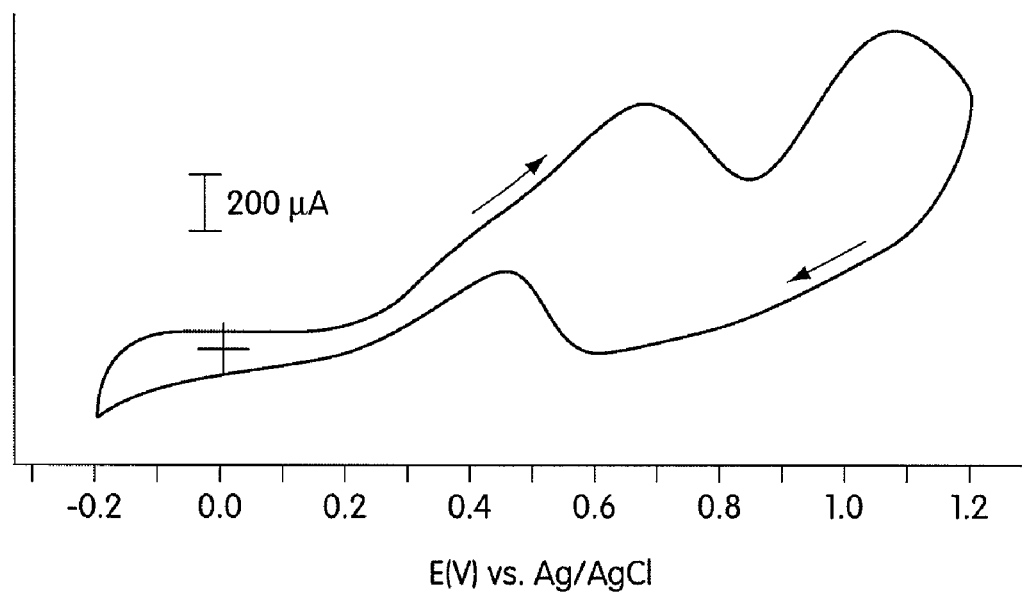

Representative cyclic voltammograms for PtBi (FIG. 16A; prepared in Example 1), PtIn (FIG. 16B), and PtPb (FIG. 16C) are shown in FIG. 5, and the results from active materials are summarized in Table 6. While measurements of peak current were limited to the oxidation wave at ca. 0.6 V for each material, a second oxidation wave was visible at between 1.0 and 1.1 V. It is believed that none of these materials oxidized ethanol completely to $CO_2$ at low potentials, instead generating only intermediates (likely including acetic acid) as C—C bond cleavage is likely the most mechanistically difficult step.

Figure 17A:
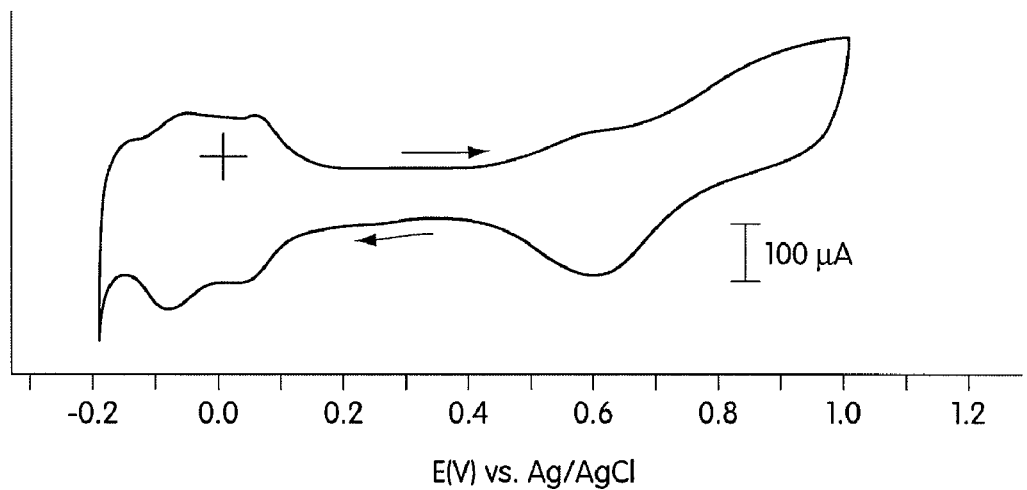
FIGS. 17A and 17B respectively show voltammetric profiles in acetic acid for an ordered intermetallic PtIn electrode surface and an ordered intermetallic PtPb electrode surface, as described in Example 2.
Figure 17B:
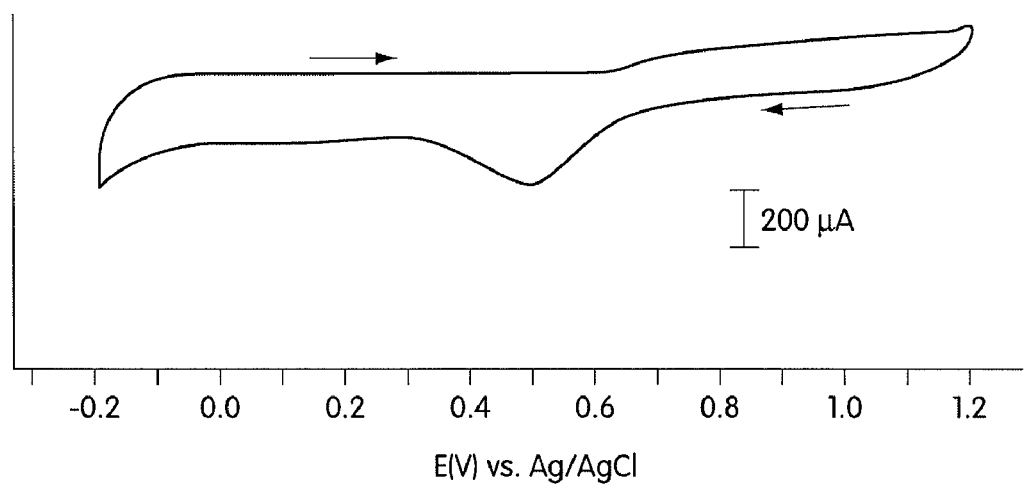

To explore this hypothesis, all electrodes were tested for activity toward acetic acid oxidation. FIGS. 17A and 17B respectively show cyclic voltammograms for PtIn and PtPb. None of these materials (including pure Pt) exhibited significant activity towards the oxidation of acetic acid, supporting the hypothesis. Of all electrodes tested, PtPb shows both a greater negative shift in onset of oxidation potential and a significantly higher current density, both compared to pure Pt.

TABLE 6

| Electrode | Electrolyte | Ethanol Concentration | Onset of Oxidation Potential | Peak Current Potential | Peak Current Density |
|---|---|---|---|---|---|
| Pt | $H_2SO_4$ | 0.25 M | 370 mV | 680 mV | 130 µA/cm$^2$ |
| Pt | $HClO_4$ | 0.125 M | 250 mV | 640 mV | 860 µA/cm$^2$ |
| PtBi | $HClO_4$ | 0.125 M | 320 mV | 560 mV | 2.2 mA/cm$^2$ |
| PtPb | $H_2SO_4$ | 0.25 M | 130 mV | 660 mV | 3.0 mA/cm$^2$ |
| PtIn | $HClO_4$ | 0.125 M | 280 mV | 650 mV | 1.3 mA/cm$^2$ |
| PtMn | $H_2SO_4$ | 0.125 M | 200 mV | 650 mV | 200 µA/cm$^2$ |
| PtSn | $H_2SO_4$ | 0.5 M | 100 mV | 390 mV | 75 µA/cm$^2$ |
| PtSb | $H_2SO_4$ | 0.5 M | 240 mV | 520 mV | 63 µA/cm$^2$ |

Ethylene Glycol Oxidation

Figure 18A:
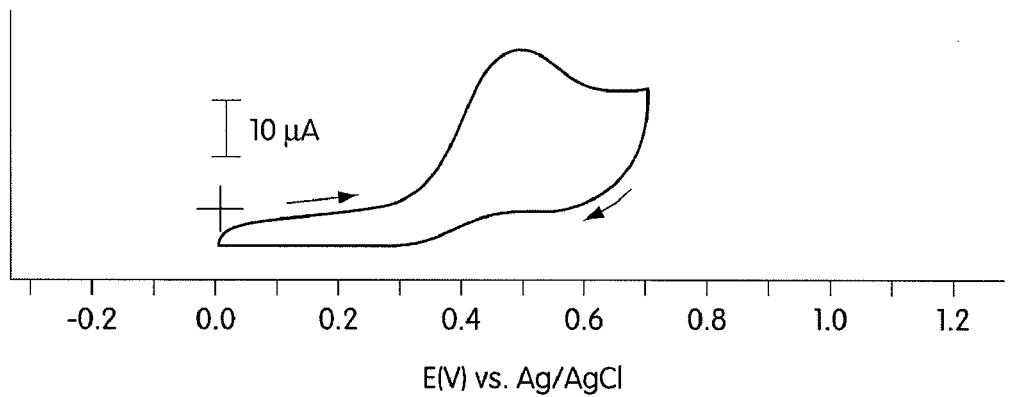
FIGS. 18A-18C respectively show voltammetric profiles in ethylene glycol for an ordered intermetallic PtBi electrode surface, an ordered intermetallic PtIn electrode surface, and an ordered intermetallic PtPb electrode surface, as described in Example 2.
Figure 18B:
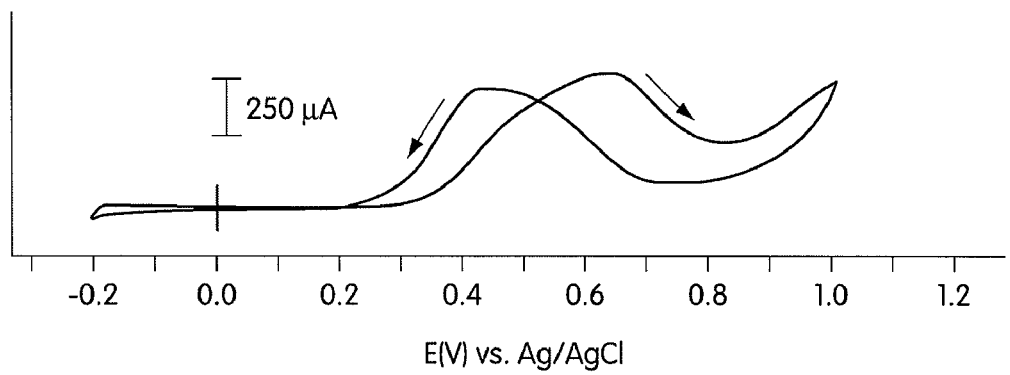
Figure 18C:
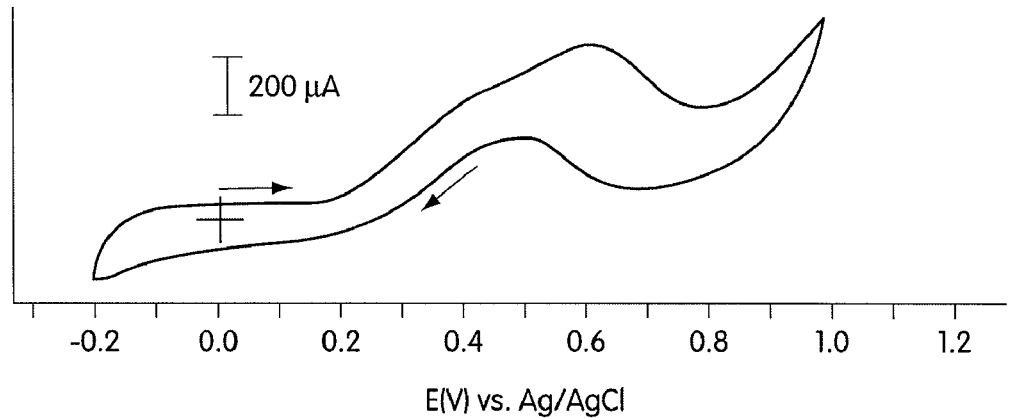

The electrode materials were tested with ethylene glycol as a potential fuel for electro-oxidation. FIGS. 18A-C show the cyclic voltammograms for PtBi (FIG. 18A; prepared in Example 1), PtIn (FIG. 18B), and PtPb (FIG. 18C), all of which were active in the oxidation of ethylene glycol. PtBi$_2$, Pt$_2$Sn$_3$, Pt$_3$Sn and PtMn exhibited relatively little activity. The results are summarized in Table 7. As previously seen for other fuels, each active intermetallic material displayed both enhanced current densities and improved onset of oxidation potentials when compared to pure Pt. In particular, PtPb showed a 110 mV negative shift in the oxidation wave and a current density six times that of Pt. As with ethanol, however, it was unclear that for any of these materials the fuel was completely oxidized to $CO_2$ until significantly more positive potentials than shown above, or if a partially oxidized species were generated. Preliminary differential electrochemical mass spectrometry, DEMS, results (unpublished) for the oxidation of ethylene glycol on PtBi indicate that the latter might be true, since no CO nor $CO_2$ was detected.

TABLE 7

| Electrode | Electrolyte | Ethylene Glycol Concentration | Onset of Oxidation Potential | Peak Current Potential | Peak Current Density |
|---|---|---|---|---|---|
| Pt | $H_2SO_4$ | 0.25 M | 270 mV | 630 mV | 320 µA/cm$^2$ |
| Pt | $HClO_4$ | 0.125 M | 480 mV | 620 mV | 300 µA/cm$^2$ |
| PtBi | $HClO_4$ | 0.125 M | 310 mV | 480 mV | 810 µA/cm$^2$ |
| PtPb | $H_2SO_4$ | 0.25 M | 160 mV | 590 mV | 1.9 mA/cm$^2$ |
| PtIn* | $HClO_4$ | 0.125 M | 310 mV | 630 mV | 960 µA/cm$^2$ |
| PtSn | $H_2SO_4$ | 0.5 M | 140 mV | 320 mV | 23 µA/cm$^2$ |
| PtSb | $H_2SO_4$ | 0.5 M | 315 mV | 560 mV | 34 µA/cm$^2$ |

*scan rate: 30 mV/s

Conclusions

The electrocatalytic activities of a wide range of ordered intermetallic compounds toward a variety of potential fuels have been studied, and results have been compared to those of a pure Pt electrode, prepared in an identical manner. A significant number of the ordered intermetallic phases showed electrocatalytic activity far superior to that of pure Pt in terms of both potential of onset of oxidation and current density.

Pt-containing intermetallic compounds, in particular, may exhibit high electrocatalytic activities toward a number of fuels. This finding is not surprising, because, of all elements, Pt excels at catalysis of dissociative chemisorption of SOMs (small organic molecules), which is believed to be the initial step in electroxidation. For each element tested in multiple phases (Bi, In, Sn, Sb), the one-to-one stoichiometric phase (in most cases, a NiAs structure) displayed the highest activity in terms of onset potential, current density, and types of fuel oxidized. Electrode stability appeared to be enhanced by the presence Pt, as particularly Pt-poor materials (PtSn$_2$, PtSn$_4$, Pt$_3$In$_7$) readily dissolved at any potential, though it is too soon to conclude whether this effect was primarily driven by overall Pt content, or by dilated nearest neighbor Pt—Pt distances. PtIn$_2$ and PtSb$_2$ were both relatively inactive and have nearest Pt—Pt distances of 4.501 Å and 4.555 Å, respectively. Most active phases have nearest neighbor Pt—Pt of approximately 2.8 Å along one axis and of greater than 4 Å in any other direction, and these dilated Pt—Pt distances may be the source of higher resistance to poisoning.

The contention that formic acid can serve as a model fuel for candidate materials is now well-founded, as no material relatively inactive to formic acid showed any activity toward any other fuel tested, and formic acid can be used with confidence as an initial screen for new active intermetallic phases.

In summary, ordered intermetallic phases afford enough control of surface characteristics to tailor a substrate to enhance C—C bond cleavage so as to make ethanol and other C-2 SOMs viable fuels for fuel cell applications.

Summary of Results

The following table (Table 8) summarizes the results of the experiments described above.

TABLE 8

| FUEL | Formic Acid | Methanol | Ethanol | Ethylene Glycol | Acetic Acid |
|---|---|---|---|---|---|
| Pt | P | P | P | P | L |
| PtRu(90:10) | A | A | A | A | L |
| PtRu(80:20) | A | A | A | A | L |
| PtRu(70:30) | A | A | A | A | L |
| PtRu(50:50) | A | A | A | A | A |
| PtBi | A | L | A | A | L |
| PtBi$_2$ | A | L | L | L | L |
| PtPb | A | A | A | A | L |
| PtIn | A | A | A | A | L |
| Pt$_2$In$_3$ | A | | | | |
| PtIn$_2$ | L | | | | |
| Pt$_3$In$_7$ | C | C | C | C | C |
| PtMn | A | L | A | L | L |
| Pt$_3$Sn | A | L | L | L | L |
| PtSn | A | A | A | A | L |
| Pt$_2$Sn$_3$ | A | L | L | L | L |
| PtSn$_2$ | C | C | C | C | C |
| PtSn$_4$ | C | C | C | C | C |
| PtSb | A | A | A | A | L |
| PtSb$_2$ | L | L | L | L | L |
| PdBi | A | L | L | L | L |
| PdSb | L | L | L | L | L |
| PdGe | L | L | L | L | L |

High Activity A
Lower Activity L
Poisons P
Unstable C
Untested

EXAMPLE 3

The poisoning effects of thiophene (a representative sulfur containing material) was examined on Pt and PtPb intermetallic compound electrodes. In these experiments, the electrodes (Pt, PtPb) were in contact with a 0.5M solution of formic acid in 0.1M sulfuric acid. An initial potential of −0.3 volts was applied and then changed to +0.3; a value where formic acid is oxidized at both electrodes. After the current had stabilized, (after 1700 sec.) 50 μL of a solution of thiophene in ethanol were added so that the thiophene concentration was 8.5 ppm (parts per million).

Figure 19A:
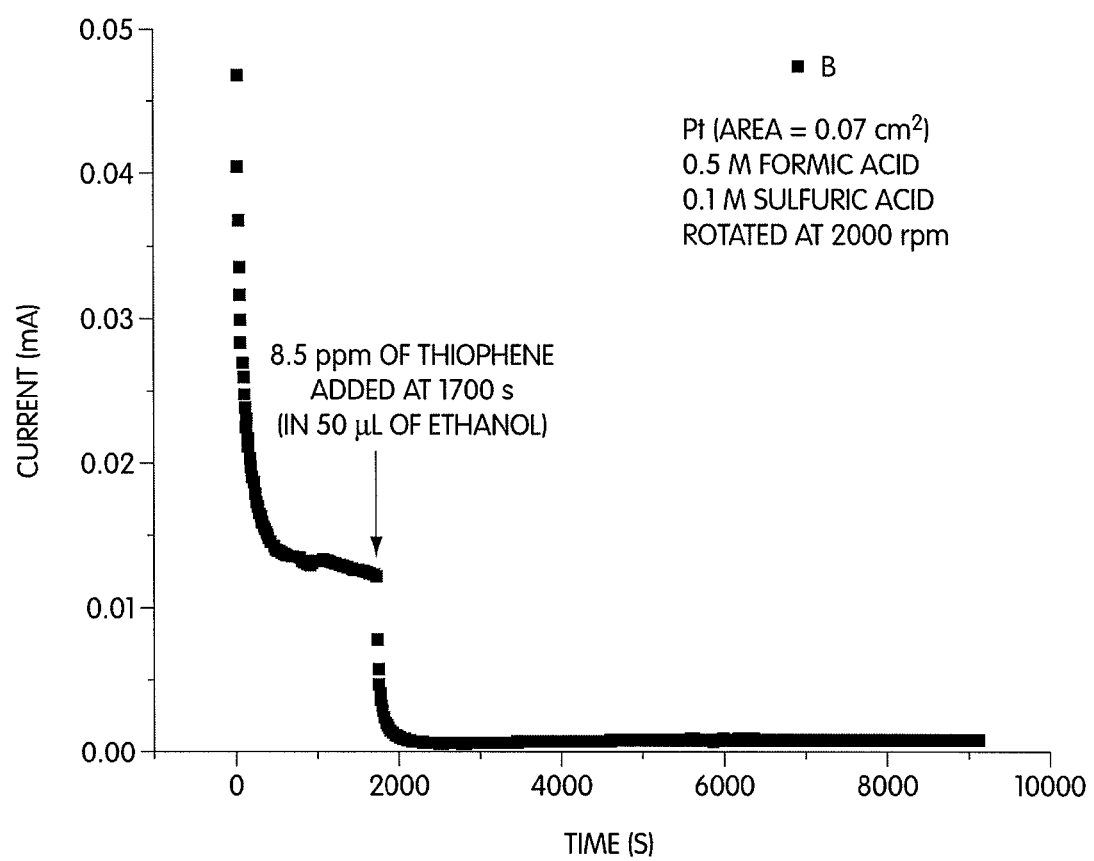
FIGS. 19A and 19B are respective graphs of current versus time for a Pt electrode and PtPb electrode in a solution of thiophene in ethanol, as described in Example 3.

FIG. 19A shows a precipitous drop of the current to essentially background levels in a very short time period for the Pt electrode.

Figure 19B:
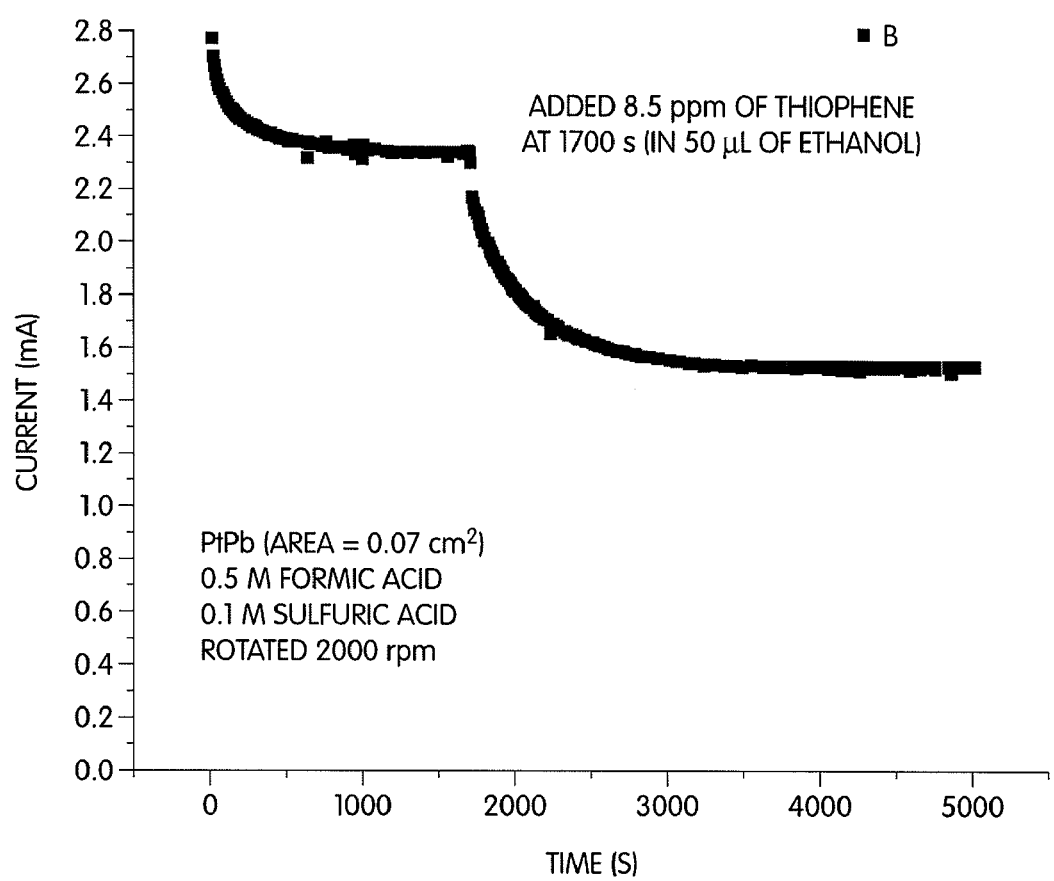

FIG. 19B shows a slow, initial drop of about 30% and maintenance of a stable current at about 70% of the level present prior to the injection of thiophene for the PtPb electrode.

The results suggest that the PtPb retains a high degree (70%) of activity even in the presence of high concentrations of sulfur-containing materials.

It should be understood that although particular embodiments and examples of the invention have been described in detail for purposes of illustration, various changes and modifications may be made without departing from the scope and spirit of the invention. Accordingly, the invention is not to be limited except as by the appended claims.

What is claimed is:

1. A catalyst designed for use in a catalytic system, the catalyst comprising an ordered intermetallic compound, wherein the ordered intermetallic compound is PtPb and the catalyst oxidizes a fuel in the catalytic system selected from the group consisting of formic acid, methanol, ethanol and ethylene glycol.

2. The catalyst of claim 1, wherein the catalytic system is a fuel cell.

3. The catalyst of claim 1, wherein the ordered intermetallic compound has an interatomic nearest neighbor distances of greater than at least 3.0 Angstroms along at least one axis.

4. The catalyst of claim 1, wherein the ordered intermetallic compound is a powder.

5. The catalyst of claim 4, wherein the powder is embedded in the surface of an electrically conductive material to form an electrode.

6. The catalyst of claim 1, wherein the fuel is methanol.

7. The catalyst of claim 1, wherein the fuel is ethanol.

8. The catalyst of claim 1, wherein the fuel is formic acid.

9. The catalyst of claim 1, wherein the fuel is ethylene glycol.

* * * * *